US012158351B2

United States Patent
Das et al.

(10) Patent No.: US 12,158,351 B2
(45) Date of Patent: Dec. 3, 2024

(54) SYSTEMS AND METHODS FOR INFERRING INFORMATION ABOUT STATIONARY ELEMENTS BASED ON SEMANTIC RELATIONSHIPS

(71) Applicant: Lyft, Inc., San Francisco, CA (US)

(72) Inventors: Ritwik Subir Das, Mountain View, CA (US); Kris Richard Efland, Lafayette, CA (US); Nadha Nafeeza Gafoor, Sunnyvale, CA (US); Nastaran Ghadar, Pleasanton, CA (US); Meng Tao, Redwood City, CA (US)

(73) Assignee: Lyft, Inc., San Francisco, CA (US)

( * ) Notice: Subject to any disclaimer, the term of this patent is extended or adjusted under 35 U.S.C. 154(b) by 788 days.

(21) Appl. No.: 16/917,672

(22) Filed: Jun. 30, 2020

(65) Prior Publication Data

US 2021/0404841 A1 Dec. 30, 2021

(51) Int. Cl.
*G01C 21/36* (2006.01)
*G01C 21/00* (2006.01)
*G01C 21/34* (2006.01)
*G06F 18/214* (2023.01)
*G06V 20/56* (2022.01)
*G06V 20/58* (2022.01)

(52) U.S. Cl.
CPC ..... *G01C 21/3602* (2013.01); *G01C 21/3492* (2013.01); *G01C 21/3833* (2020.08); *G01C 21/3896* (2020.08); *G06F 18/214* (2023.01); *G06V 20/582* (2022.01); *G06V 20/584* (2022.01); *G06V 20/588* (2022.01)

(58) Field of Classification Search
CPC ............ G01C 21/3602; G01C 21/3492; G01C 21/3833; G01C 21/3896; G01C 21/3807; G06F 18/214; G06V 20/584; G06V 20/588
See application file for complete search history.

(56) References Cited

U.S. PATENT DOCUMENTS

| 2017/0008521 | A1* | 1/2017 | Braunstein | G05D 1/0219 |
| 2018/0188060 | A1* | 7/2018 | Wheeler | G01C 21/3635 |
| 2020/0133283 | A1* | 4/2020 | Hirano | G05D 1/0214 |

* cited by examiner

*Primary Examiner* — Kenneth J Malkowski
(74) *Attorney, Agent, or Firm* — Lee Sullivan Shea & Smith LLP

(57) ABSTRACT

Examples disclosed herein may involve a computing system configured to (i) identify a stationary element in a real-world environment for which to infer information, (ii) detect a semantic relationship between the stationary element and one or more other stationary elements in the real-world environment, (iii) based on the detected semantic relationship, infer information about the stationary element, (iv) include the inferred information about the stationary element within a set of information that describes the stationary element.

19 Claims, 11 Drawing Sheets

SYSTEMS AND METHODS FOR INFERRING INFORMATION ABOUT STATIONARY ELEMENTS BASED ON SEMANTIC RELATIONSHIPS

BACKGROUND

In various areas of technology, pre-processed information about the world (which may sometimes be referred to as a map or map data) may be utilized to perform various operations. As one example of such a technology area, on-board computing systems of vehicles (e.g., autonomy systems and/or advanced driver assistance systems) may use pre-processed information about the world when performing operations for vehicles such as localization, perception, prediction, and/or planning, among other possibilities. As another example of such a technology area, transportation-matching platforms may use pre-processed information about the world to perform operations such as matching individuals with available vehicles, generating routes for vehicles to follow when picking up and/or transporting individuals, providing estimates of pickup and drop-off times, choosing locations for performing pickups and/or drop-offs, and/or pre-positioning vehicles within the given area in anticipation of responding to transportation requests, among other possibilities. It should be understood that pre-processed information about the world (or perhaps other geographically-associated information) may be used in various other areas of technology as well. As such, there is a need for techniques that are capable of generating accurate, up-to-date information about the world that can be used for these applications.

SUMMARY

In one aspect, the disclosed technology may take the form of a method that involves (i) identifying a stationary element in a real-world environment for which to infer information, (ii) detecting a semantic relationship between the stationary element and one or more other stationary elements in the real-world environment, (iii) based on the detected semantic relationship, inferring information about the stationary element, and (iv) including the inferred information about the stationary element within a set of information that describes the stationary element.

In some example embodiments, the stationary element may include a traffic light, the one or more other stationary elements may include one or both of (i) a traffic sign or (ii) a traffic lane, and the inferred information may include one or more of (i) signal-face information for the traffic light, (ii) lane-control information for the traffic light, or (iii) traffic-rule information for the traffic light.

Further, in example embodiments, the stationary element may include a traffic light, and detecting the semantic relationship between the traffic light and the one or more other stationary elements may involve detecting a traffic sign of a given type that is located in a given direction relative to the traffic light and within a threshold distance from the traffic light.

Further yet, in example embodiments, the stationary element may include a traffic lane, and detecting the semantic relationship between the traffic lane and the one or more other stationary elements may involve detecting a traffic sign of a given type that is located adjacent to the traffic lane.

Still further, in some example embodiments, inferring information about the stationary element may involve deriving information about the one or more other stationary elements in the real-world environment, such as deriving one or more of (i) a classification of a traffic sign or (ii) an indication of text that is displayed on the traffic sign, and using the derived information about the one or more other stationary elements as a basis for inferring the information about the stationary element.

Still further, in some example embodiments, the set of information that describes the stationary element may include information about the stationary element that is derived from sensor data.

Still further, in some example embodiments, the method may involve encoding the set of information that describes the stationary element into a map for the real-world environment.

Still further, in some example embodiments, the method may involve using the set of information that describes the stationary element as training data for a machine-learning model that is configured to predict information about corresponding stationary elements of a same type as the stationary element, which may include information indicating that a semantic relationship exists between the corresponding stationary elements and one or more other stationary elements.

Still further, in some example embodiments, the method may involve updating a map for the real-world environment to include the set of information that describes the stationary element and, based on the set of information that describes the stationary element in the updated map, generating a route for a vehicle to follow in the real-world environment.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1A:
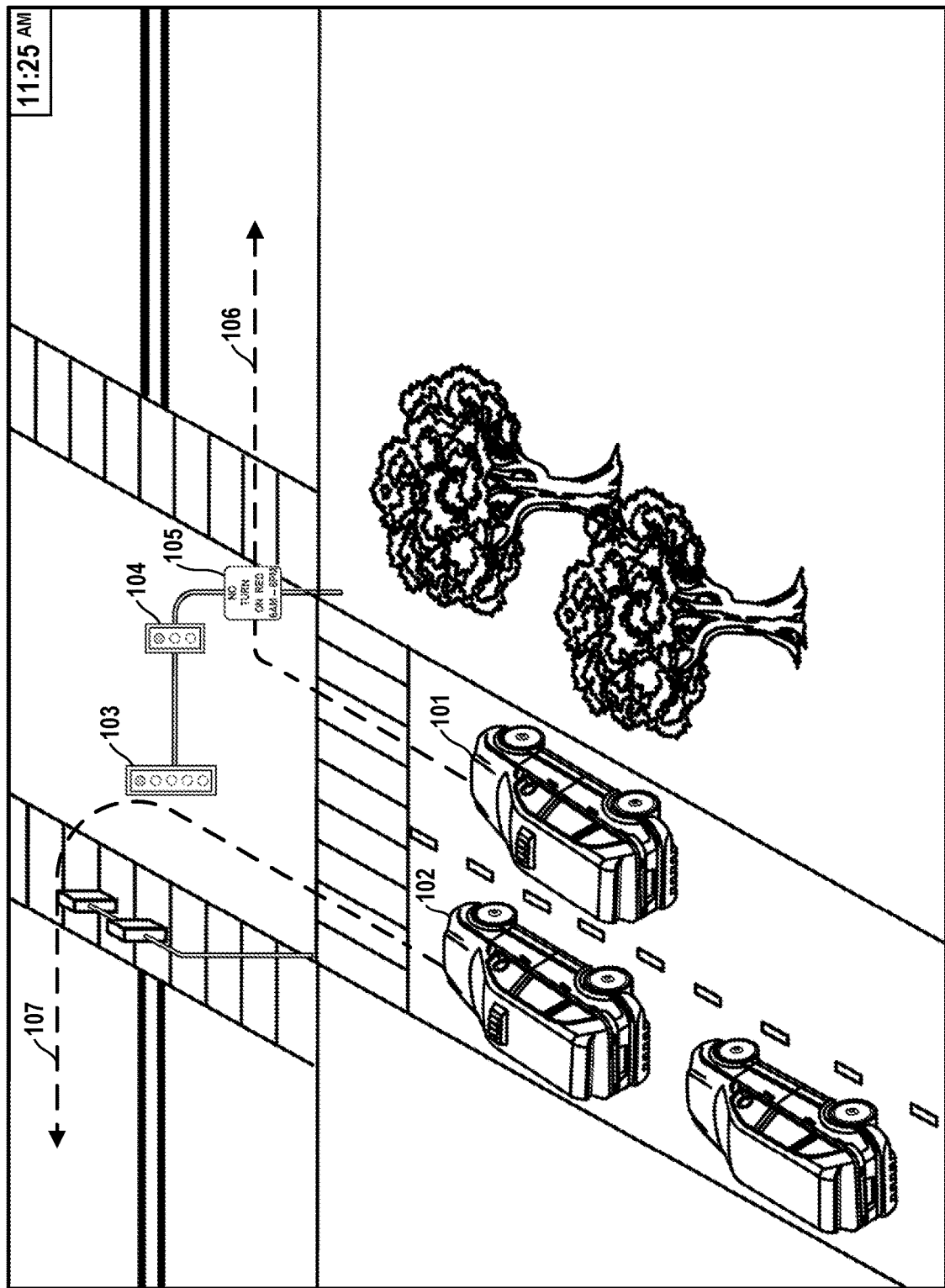
FIG. 1A is a diagram that illustrates an example showing vehicles operating in the real world without certain semantic information for a traffic light.

As noted above, pre-processed information about the world (which may sometimes be referred to as a map or map data) plays an important role in various areas of technology. For instance, on-board computing systems of vehicles (e.g., autonomy systems and/or advanced driver assistance systems) may use a map that comprises pre-processed information about the world for various purposes. As one specific example, an on-board computing system of a vehicle may be configured to localize the vehicle within such a map and then use other data encoded within the map to help establish a baseline understanding of the real-world environment in which the vehicle is located, such as road-network data that provides information about the road network within the real-world environment in which the vehicle is located, geometric data that provides information about the physical geometry of the real-world environment in which the vehicle is located, and/or semantic data that provides information about the semantic elements within the real-world environment in which the vehicle is located (e.g., lanes, traffic lights, traffic signs, crosswalks, etc.), which can then be utilized by the on-board computing system when performing operations such as perception of other agents in the real-world environment, prediction of the future behavior of agents in the real-world environment, and/or planning of the vehicle's future behavior within the real-world environment. In this way, the map provides the on-board computing system of the vehicle with precomputed baseline information about the vehicle's surrounding environment that generally has a high level of accuracy, which may reduce the need for the on-board computing system to derive this baseline information in real time and thereby reduce the computational burden of the vehicle's on-board computing system while also enhancing the reliability of the operations such as perception, prediction, and planning.

Transportation-matching platforms (e.g., platforms configured to match individuals interested in obtaining transportation with vehicles capable of providing such transportation) may use maps to perform various different operations, including but not limited to matching individuals with available vehicles within the given area, generating routes for vehicles to follow when picking up and/or transporting individuals within the given area, providing estimates of pickup and drop-off times within the given area, and/or pre-positioning vehicles within the given area in anticipation of responding to transportation requests, among other possibilities.

It should be understood that pre-processed information about the world may be used in various other areas of technology as well.

In practice, the depth of information that a map generally needs to have for each different element in a real-world environment in order to facilitate safe and efficient operation of a vehicle within that real-world environment may vary depending on the type of element. For instance, there may be some types of elements in a real-world environment for which a map may only need to have a relatively basic set of information, such as classification information and position information for the element, in order to facilitate safe and efficient interaction with those elements by vehicles operating in the real-world environment. On the other hand, there may be other types of elements in a real-world environment for which the map may need to have a more in-depth set of information in order to facilitate safe and efficient interaction with those elements by a vehicle operating in the real-world environment.

One specific type of a real-world element for which a map generally needs to have a more in-depth set of information is a traffic light. Indeed, having access to the classification and position information alone is typically not sufficient to enable a vehicle's on-board computing system or a transportation-matching platform to develop a safe and efficient plan for interacting with the traffic-light element. Rather, a vehicle's on-board computing system generally also needs access to information regarding which types of signal faces are included within the traffic light (where a signal face's type is generally defined by the color and shape of the symbol that is displayed when the signal face is activated), which one or more signal faces of the traffic light are currently activated. Further, a vehicle's on-board computing system or a transportation-matching platform may also need access to information regarding which one or more traffic lanes are controlled by the traffic light and its different signal faces, and what traffic rules (if any) are applicable to the traffic light and its different signal faces, among other possibilities.

Figure 1B:
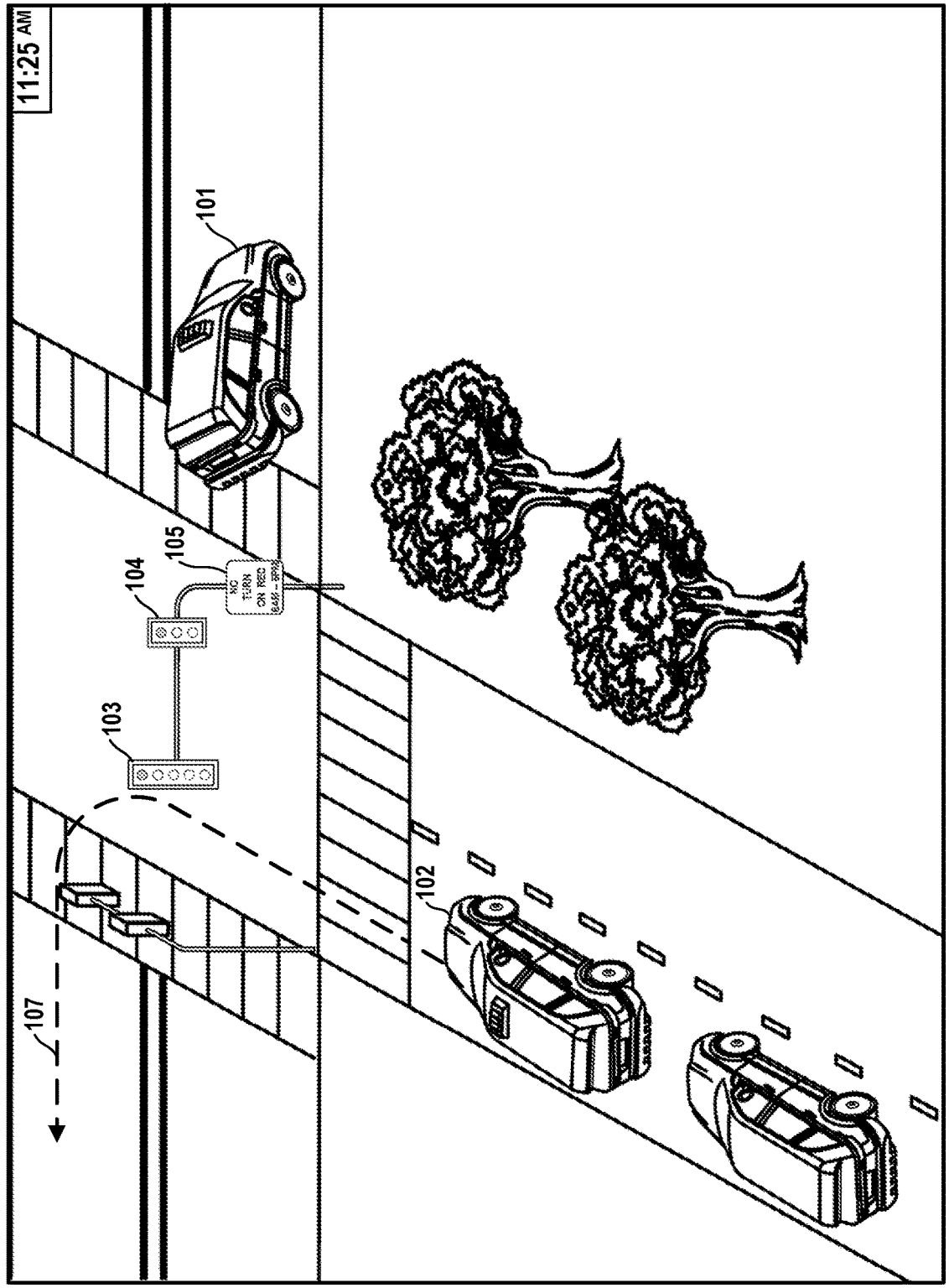
FIG. 1B is a diagram that illustrates another example of a vehicle operating in the real world without certain semantic information for a traffic light.
Figure 1C:
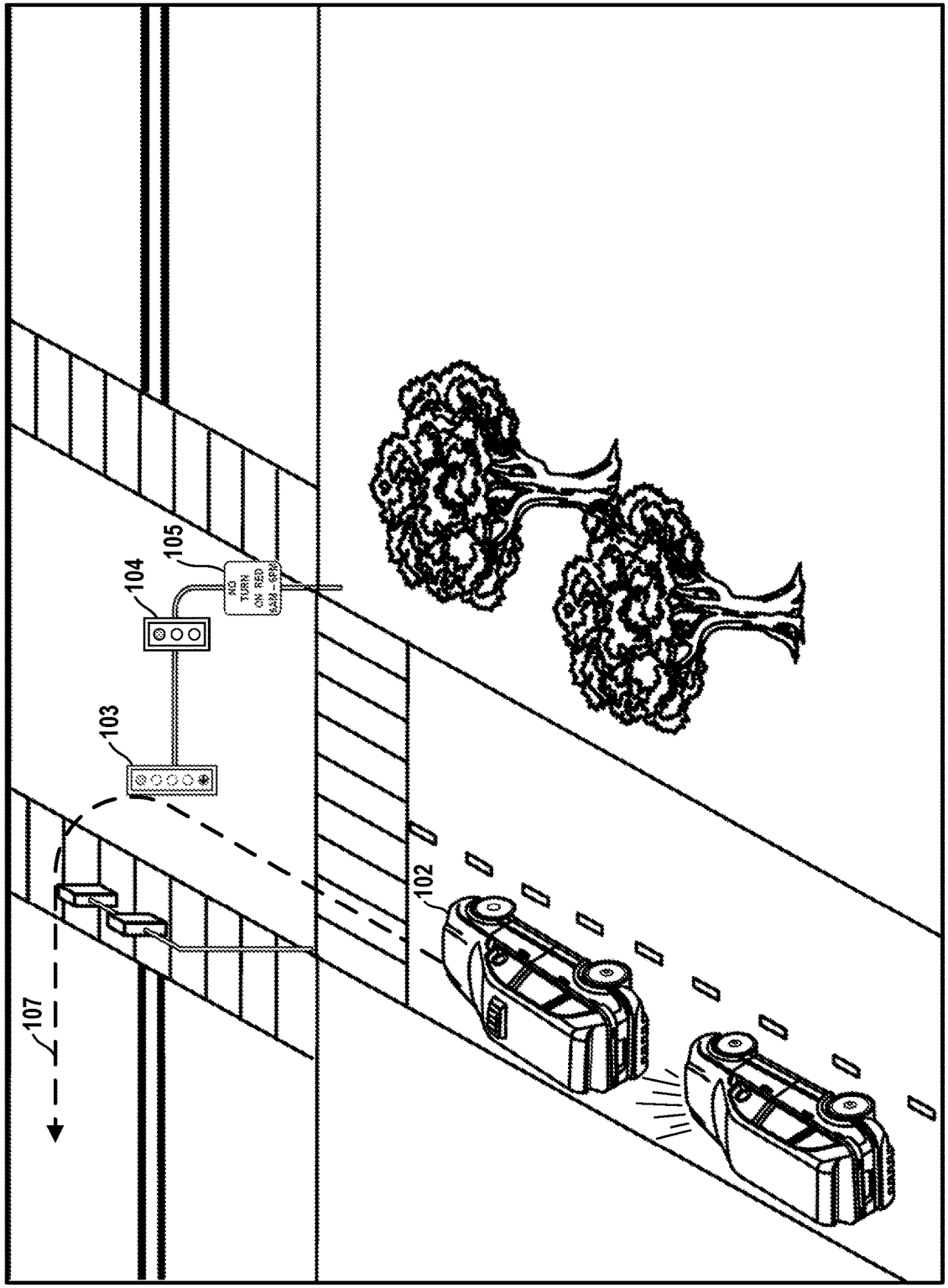
FIG. 1C is a diagram that illustrates another example of a vehicle operating in the real world without certain semantic information for a traffic light.

FIGS. 1A-1C depict an example scenario that helps to illustrate why a vehicle's on-board computing system and/or a transportation-matching platform generally needs access to this additional information for a traffic-light element. As shown in FIG. 1A, two vehicles are at a four-way intersection controlled by traffic lights, where a first vehicle 101 is in a right lane of the roadway and a second vehicle 102 is in a left lane of the roadway. Further, as shown, the intersection includes a traffic-light post with two traffic lights—a first traffic light 103 to the left side of the post and a second traffic light 104 to the right side of the post. The first traffic light 103 is shown to include five different signal faces in a vertical configuration, which comprise a red light, a yellow light, a green light, a yellow left turn arrow, and a green left turn arrow, whereas the second traffic light 104 is shown to include three different signal faces in a vertical configuration, which comprise a red light, a yellow light, and a green light. Further yet, as shown, there is also a "No Turn on Red" traffic sign 105 that is affixed to the traffic post, which specifies that vehicles should not turn on red between 6 AM and 6 PM.

In this example scenario, the traffic lights 103 and 104 are initially shown in FIG. 1A have their red-light faces activated to signify that vehicles should be stopped, and the on-board computing systems of the vehicles 101 and 102 have been able to determine that the red-light faces of the traffic lights 103 and 104 are activated based on 2D image data captured by the on-board computing systems. As a result, the vehicles 101 and 102 are both initially sitting stopped at the intersection.

Further, in this example scenario, the on-board computing system of the vehicle 101 may have determined that the near-term plan for the vehicle 101 involves turning right at the intersection in order to advance the vehicle 101 towards its desired destination, as shown by the dashed trajectory line 106. However, in order to properly plan the turning behavior of the vehicle 101 at the intersection, the on-board computing system of the vehicle 101 also needs information about the traffic rules that are applicable to the traffic lights 103 and 104 at the intersection—including the specific rule about when a right turn on a red light is permitted that is signified by the "No Turn on Red" traffic sign 105. Indeed, if the on-board computing system of the vehicle 101 does not have this information, then this could lead to the vehicle 101 behaving in an undesirable manner.

For example, absent this additional information about traffic lights 103 and 104, the on-board computing system of the vehicle 101 may otherwise function to evaluate the current scenario being faced at the intersection to determine whether it would be safe for the vehicle 101 to turn right while the traffic lights 103 and 104 have their red lights activated, and then if so, cause the vehicle 101 to turn right on the red light—which would result in a traffic violation if the vehicle 101 had been operating in the intersection between 6 AM and 6 PM. Such an illegal turn is illustrated in FIG. 1B.

Further yet, in this example scenario, an on-board computing system of the vehicle 102 may have determined that the near-term plan for the vehicle 102 involves turning left at the intersection in order to advance the vehicle 102 towards its desired destination, as shown by the dashed trajectory line 107. However, in order to properly plan the turning behavior of the vehicle 102 at the intersection, the on-board computing system of the vehicle 102 needs information about which types of signal faces are included in the traffic lights 103 and 104, which of the traffic lights 103 and 104 controls the left lane, and what traffic rules are applicable to the traffic lights 103 and 104 at the intersection. Indeed, if the on-board computing system of the vehicle 102 does not have this information, then this could also lead to the vehicle 102 behaving in an undesirable manner.

For example, the depicted intersection may be designed such that the first traffic light 103 controls the left lane of the roadway, and the first traffic light 103 may be configured to activate its left turn arrow after the red light in order to signify that vehicles in the left lane should turn left. However, if the on-board computing system of the vehicle 102 does not have prior access to information indicating that the first traffic light 103 controls the left lane and includes a green left turn arrow, the on-board computing system of the vehicle 102 may not be capable of confidently determining in real time that the vehicle 102 should commence its left turn when the green left turn arrow of the first traffic light 103 is activated, which may result in the vehicle 102 continuing to sit stopped at the intersection until the traffic light 103 later activates the green light. This behavior, which is depicted in FIG. 1C, may have several undesirable consequences, including adding unnecessary delay to the journey of the vehicle 102 and also adding unnecessary delay to the journey of other vehicles behind the vehicle 102 by impeding those vehicles' ability to turn left while the green left turn arrow is activated.

As another example, if a transportation-matching platform were generating the routes shown in FIG. 1A for vehicles 101 and 102 in the absence of the additional information discussed above, it may degrade the accuracy of certain operations performed by the transportation-matching platform such as estimating pickup and drop-off times or matching individuals with available vehicles, among other possible operations. For instance, the transportation-matching platform may estimate an inaccurate time of arrival for vehicle 101 if it does not have access to the additional information related to the traffic sign 105, which may cause the vehicle 101 to stand at the intersection longer than it otherwise would during certain times of the day. Similarly, the transportation-matching platform might inaccurately estimate how quickly the vehicle 102 is capable of proceeding through the intersection if the additional information regarding the dedicated left turn arrow is not available. This may result in the transportation-matching platform matching an individual interested in obtaining transportation (i.e., a "transportation requestor") with a different vehicle when vehicle 102 could have reached the transportation requestor sooner. Other examples are also possible.

It should be understood that FIGS. 1A-1C merely depict some possible examples of scenarios in which on-board computing systems of vehicles or a transportation-matching platform may need access to more in-depth information about a traffic-light element, and that more in-depth information about a traffic-light element and other static traffic elements may be needed in many other situations as well.

Based on the foregoing, it will be appreciated that both a vehicle's on-board computing system and a transportation-matching platform generally need some way to obtain this additional information about a traffic light that is encountered by vehicles in the real world. In this respect, it may be possible for a vehicle to determine some limited information about a traffic-light element in real time based on the sensor data captured by the vehicle. For example, in line with the discussion above, it is typically possible for a vehicle's on-board computing system to make an initial determination of which signal face of a traffic light is currently activated by performing object detection on 2D image data that is captured by the on-board computing system (e.g., as part of the perception operation). However, for information such as this that can be determined in real time from sensor data captured by the on-board computing system, it is still often necessary for the on-board computing system to validate the determined information against encoded knowledge about the traffic light (e.g., a validated list of the signal faces included in the traffic light) before relying on the determined information for purposes of planning the behavior of the vehicle.

Moreover, it may be difficult or impossible for a vehicle's on-board computing system to determine other kinds of information about a traffic light in real time. For instance, while a vehicle's on-board computing system may be able to make an initial determination of which signal face of a traffic light is currently activated by performing objection detection on 2D image data captured by the on-board computing system, it is typically difficult or impossible for a vehicle's on-board computing system to determine information about the full set of signal faces included in the traffic light in real time. There are a few reasons for this.

First, object-detection models for detecting the different signal faces of a traffic light typically function to classify the signal faces of a traffic light based on the color and shape of the symbols displayed by such faces when activated, and it is often difficult or impossible to recognize this information when a signal face is not activated. However, in practice, only a limited subset of the signal faces included in a traffic light are typically activated during the time that the traffic light is in the field of view of the sensor-equipped vehicle's sensors. Because of this, a vehicle's on-board computing system is typically unable to determine the full set of signal faces included in a traffic light by performing object detection on the 2D image data that represents the traffic light.

Second, the universe of different signal-face configurations that could possibly be included in a traffic light is very large, as there tends to be a lot of variance in signal-face configurations from traffic light to traffic light—particularly when looking at traffic lights in different localities (e.g., different towns, cities, etc.). Because of this, it is also difficult or impossible to accurately predict the signal-face configuration of a traffic light based on sensor data indicating the general arrangement of the signal faces included in the traffic. For example, while an on-board computing system may be able to use sensor data to determine that a traffic light has a vertical configuration with five signal faces, this information is still typically not sufficient to enable the on-board computing system to accurately predict the specific types of signal faces included in the traffic light, because it is possible that a vertical arrangement of five signal faces could have various different combinations of faces depending on the locality in which the traffic light exists and/or the nature of the intersection that is controlled by the traffic light.

Thus, given that it is difficult or impossible for a vehicle's on-board computing system to determine information about the full set of signal faces included in the traffic light in real time, the on-board computing system generally needs to rely on a map in order to obtain this information.

Along similar lines, various other information about a traffic light can be difficult or impossible for a vehicle's on-board computing system to determine in real time, including but not limited to information regarding which one or more traffic lanes are controlled the traffic light and its different signal faces and/or what traffic rules (if any) are applicable to the traffic light and its different signal faces, among other possibilities. Thus, as with the information about the full set of signal faces included in the traffic light, the on-board computing system generally needs to rely on a map in order to obtain this additional information about a traffic light.

However, existing approaches for encoding this type of in-depth information about traffic lights into a map are heavily reliant on manual curation by humans, which tends to be tedious, time consuming, and costly. For example, in order to encode information about the type and location of the signal faces included in a traffic light, existing approaches typically require a human curator to review and manually label the signal faces of the traffic light in a number of different 2D images in which the traffic light appears using a curation tool (or the like). As another example, in order to encode information about which one or more traffic lanes are controlled a traffic light, existing approaches may require a human curator to review sensor data (e.g., 2D image data) that depicts the spatial relationship between a traffic light and any nearby lanes, discern which of the nearby lanes is controlled by the traffic light as a whole as well as which of the nearby lanes is controlled by each individual signal face of the traffic light, and then manually enter that information about the traffic light using a curation tool (or the like). As yet another example, in order to encode information about what traffic rules are applicable to a traffic light, existing approaches may require a human curator to review information about the traffic rules that apply to the intersection, discern which of the traffic rules apply to the traffic light and its individual signal faces, and then input that information using a curation tool (or the like).

In practice, the foregoing process often takes up to 30 minutes or more to complete for each traffic light, and this process typically needs to be repeated for every single traffic light that exists in the geographic region being mapped—which serves to illustrate why manual curation of information about traffic lights tends be tedious, time consuming, and costly.

Notably, there are also various other types of stationary elements in the real world for which a vehicle's on-board computing system or a transportation-matching platform may need a more in-depth set of information in order to facilitate safe and efficient interaction with those elements, including but not limited to traffic lanes, parking lanes, bus stops, traffic signs, etc., which gives rise to the same problems discussed above with respect to obtaining in-depth information about traffic lights.

In order to address these and other problems, disclosed herein is a flexible framework for determining information about stationary elements in the real word, such as traffic lights, traffic lanes, parking lanes, bus stops, etc. At a high level, this flexible framework may involve: (i) identifying a given stationary element in a real-world environment for which to determine additional information, (ii) detecting a semantic relationship between the given stationary element and one or more other stationary elements in the real-world environment, (iii) based on the detected semantic relationship, inferring information about the given stationary element, and then (iv) including the inferred information within a set of information that describes the given stationary element, which can then be encoded into a map and/or used as training data for a machine-learning model that is configured to predict information about other comparable stationary elements, among other possible uses for such information.

For instance, as one specific example to illustrate, the disclosed framework may be used to (i) identify a given traffic-light element in real-world environment for which to determine additional information (e.g., a traffic light that has been newly-detected), (ii) detect an semantic relationship between the given traffic light and a nearby traffic sign (e.g., a "no turn on red" sign, "left turn yield on green" sign, etc.), (iii) based on the detected semantic relationship, infer information about the given traffic light (e.g., traffic-rule information and/or signal-face information for the given traffic light), and then (iv) including the inferred information within a set of information that describes the given traffic light, which can then be encoded into a map for the real-world environment and/or used as training data for a machine-learning model that is configured to predict information about other comparable traffic lights.

However, it should be understood that there may be semantic relationships between many other combinations of stationary elements in the real world as well, and the disclosed framework may be used to detect the semantic relationships between various different combinations of stationary elements in a real-world environment and then leverage the detected semantic relationships in order to determine in-depth information about stationary elements in the real world without having to rely on time-consuming, costly manual curation.

As noted above, the additional information about stationary elements in a real-world environment that is determined using the disclosed framework may be encoded into a map for the real-world environment, which may provide various advantages. For instance, as one possible advantage, encoding the additional information about stationary elements into a map may then enable a vehicle's on-board computing system to access such information about stationary elements in its surrounding environment when performing operations such as perception, prediction, and planning, which may improve the efficiency and reliability of these operations. To illustrate with a specific example, providing a vehicle's on-board computing system with access to preestablished signal-face information and/or traffic-rule information for traffic lights at an intersection may improve the vehicle's on-board computing system to understand the current state of the traffic lights at the intersection, predict the future state of the traffic lights at the intersection, and then plan the behavior of the vehicle as it moves through the intersection.

As another possible advantage, encoding the additional information about stationary elements into a map may then make it possible to generate more accurate estimates about the time it will take a vehicle to travel from one place to another in a real-world environment, which can help improve operations that are performed by various different kinds of systems.

For example, a vehicle's on-board computing system may use the additional information about stationary elements that has been encoded into a map to generate more accurate estimates about the time it will take the vehicle to travel from its current location to its planned destination along various different routes, which may improve the on-board computing system's ability to select the most optimal route for the vehicle and also enable the on-board computing system to provide more precise estimates of the vehicle's time-of-arrival at its planned destination.

As another example, a transportation-matching platform that is configured to match transportation requestors with vehicles that can provide such transportation may use the additional information about stationary elements that has been encoded into a map to generate more accurate estimates about the time it will take for such vehicles to travel from one place to another, which may then improve the transportation-matching platform's ability to perform various different operations—including but not limited to matching requestors with available vehicles, generating the most optimal routes for vehicles to follow when picking up and/or transporting requestors, providing accurate estimates of pickup and drop-off times, and/or effectively pre-positioning vehicles in anticipation of responding to transportation-matching requests, among other possibilities.

As yet another example, a navigation system may use the additional information about stationary elements that has been encoded into a map to generate more accurate estimates about the time it will take a vehicle to travel from one location to another along one or more different routes and then present that information to a user.

A map that has been encoded with additional information about stationary elements in a real-world environment may provide various other advantages as well.

As noted above, the additional information about stationary elements in a real-world environment that is determined using the disclosed framework may also be used as training data for a machine-learning model that is configured to predict information about other comparable stationary elements, which may likewise provide various advantages. For instance, it may not be practical or possible to determine additional information about every stationary element in every locality throughout the world using the disclosed pipeline, which gives rise to a situation where the additional information for stationary elements that is described herein may be encoded into maps for some localities and not others.

However, in order to help address the fact that the additional information for stationary elements described herein may not be available for these other localities, the additional information for stationary elements that is determined using the disclosed pipeline could then be used to train a machine-learning model (or the like) that is configured to predict certain types of information about a given stationary element based on a combination of (i) sensor data that is representative of the given stationary element and (ii) sensor data and/or other available data about other stationary elements in the vicinity of the given stationary element.

As one example to illustrate, the disclosed framework may initially be used to determine additional information for traffic lights in a first set of different localities, such as signal-face information, lane-control information, and/or traffic-rule information, based on the detected semantic relationship between such traffic lights and other nearly stationary elements (e.g., traffic signs, lanes, etc.). In turn, this additional information about the traffic lights in the first set of different localities may then be used to train a machine-learning model that is configured to predict similar information about traffic lights in a second set of localities based on a combination of (i) sensor data that is representative of a traffic light and (ii) sensor data and/or other available data about other stationary elements in the vicinity of the traffic light, which could then be used by a vehicle's on-board computing system or a transportation-matching platform to obtain additional information about traffic lights that are detected while a sensor-equipped vehicle is operating within a locality in the second set.

The additional information about stationary elements in a real-world environment that is determined using the disclosed framework may be used for other purposes as well.

One example of this disclosed framework for determining information about stationary elements in the real world will now be generally described with reference to FIG. 2A. In this regard, the functions of the example framework may be performed in whole or in part by an on-vehicle computing platform, an off-vehicle computing platform using data collected from one or more sensor-equipped vehicles, or a combination of both.

Figure 2A:
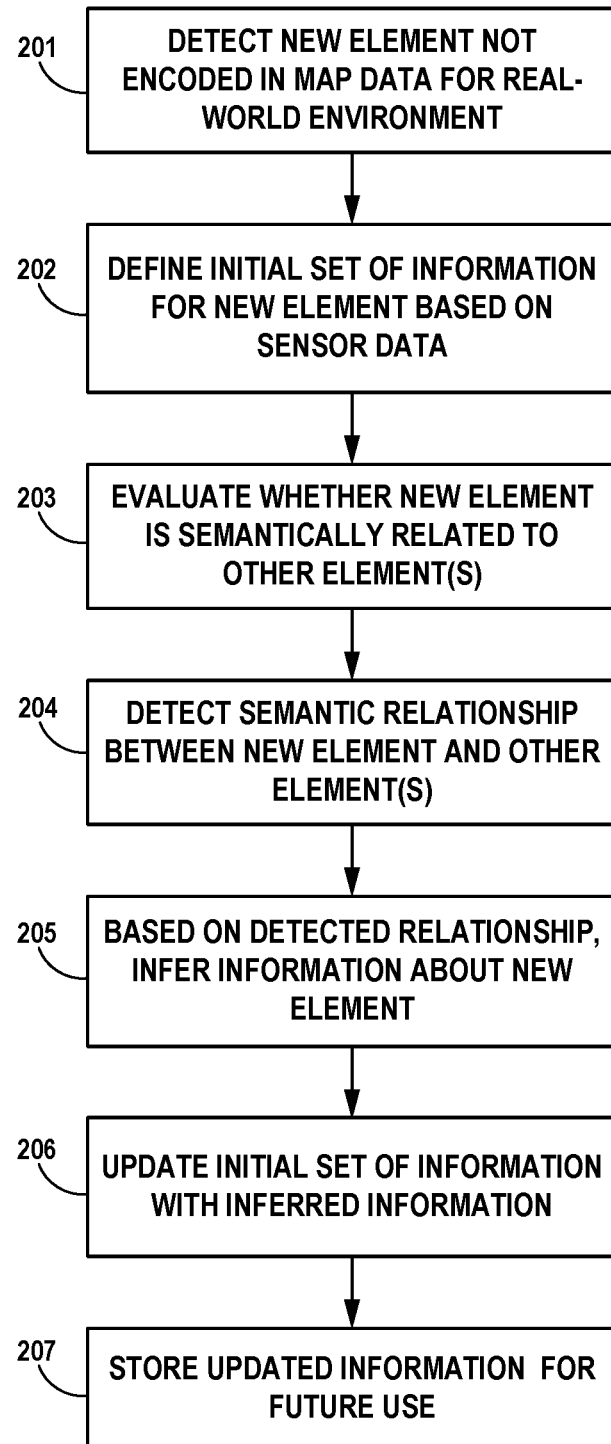
FIG. 2A is a diagram that illustrates one example of a framework that incorporates the disclosed technique for determining information about stationary elements in the real word.

At a high level, the example framework shown in FIG. 2A may begin at block 201 with the detection of a new stationary element in a real-world environment that is not encoded within the map data for the real-world environment. The new stationary element that is detected may take various forms, including a new traffic light, a new lane (e.g., a car lane, a bus lane, a bike lane, a parking lane, etc.), or a new bus stop, among other possibilities. Alternatively, and as explained below with respect to FIG. 2B, the example framework may begin with an identification of a previously-detected element that is already encoded within the map data, but which is to be updated with additional information The function of detecting the new stationary element may take various forms. In one example implementation, one or more sensor-equipped vehicles may traverse the real-world environment and collect sensor data that is representative of the real-world environment. In this regard, the sensor data may include 2D image data, 3D sensor data (e.g., 3D image data, LiDAR data, etc.), and the like. The obtained sensor data may then be analyzed using one or more machine-learning models, such as one or more object-detection models, which may result in the detection and identification of various stationary elements in the real-world environment.

The detected stationary elements may then be compared with the currently-available map data for the real-world environment to determine whether any differences exist, which may involve comparing determined position information for the detected stationary elements with the encoded position of stationary elements within the map data. This comparison may take various forms.

As one example, as part of detecting and identifying the stationary elements in the real-world environment, a 3D position for each identified stationary element may be determined (e.g., by deriving a 3D position from 2D labels assigned to the new stationary element using techniques such as projection and/or triangulation), and each detected stationary element's determined 3D position may then be compared against the 3D map data for the real-world environment (e.g., based on the vehicle's localization within the map data) in order to determine whether a stationary element of the same type is encoded at a similar 3D position within the map data. If the comparison indicates that a detected stationary element does not correspond to a stationary element within the currently-available map data (i.e., it is not represented in the map data), then it may be determined that the detected stationary element is new.

As another example, stationary elements that are encoded within the map data for the real-world environment may be projected into a set of 2D image(s) in which the detected stationary elements have been labeled, and the labels for the detected stationary elements may then be compared to the projections of the encoded stationary elements in order to determine whether each detected stationary element corresponds to a stationary element encoded within the map data. Such an approach may be useful when the obtained sensor data that was analyzed to identify stationary elements in the real-world environment is 2D image data. As above, if the comparison indicates that a detected stationary element does not correspond to a stationary element encoded within the currently-available map data, then it may be determined that the detected stationary element is new.

A new stationary element may be detected in other manners as well, based on different types of sensor data and/or different types of comparisons to the currently available map data.

At block 202 of the example framework shown in FIG. 2, an initial set of information for the newly-detected stationary element may be defined based on the obtained sensor data that is representative of the newly-detected stationary element. The information about the newly-detected stationary element that is included in the initial set of information may take various forms, and may be determined based on the sensor data in various manners.

For instance, as one possibility, the initial set of information for the newly-detected stationary element may include a classification of the newly-detected stationary element indicating what type of stationary element it is (e.g., a traffic light, a lane, etc.). In this respect, such classification information may have been derived from the sensor data as part of the function of detecting the new stationary element performed at block 201, or alternatively, such classification information could be derived after the new stationary element has been detected.

As another possibility, the initial set of information for the newly-detected stationary element may include a position of the newly-detected stationary element within the map data (e.g. represented as 3D coordinates). Similar to the classification information, this position information may also have been derived from the sensor data as part of the function of detecting the new stationary element performed at block 201, or alternatively, such position information could be derived after the new stationary element has been detected (e.g., by deriving a 3D position from 2D labels assigned to the new stationary element using techniques such as projection and/or triangulation). Other manners for determining the 3D position of the newly-detected stationary element also exist.

As yet another possibility, the initial set of information for the newly-detected stationary element may include information that is specific to the type of stationary element that was detected. For example, the initial set of information that is defined for a newly-detected traffic light may also include orientation information for the traffic light that indicates a direction that the traffic light is facing (e.g., a direction normal to the signal faces of the traffic light), which may be used to derive information about the lane or lanes that the traffic light controls. Such orientation information may be derived using computer-vision and/or machine learning techniques, among other possibilities.

As another example, the initial set of information that is defined for a newly-detected traffic light may include signal-face information for the traffic light, which may define information for one or more of the individual signal faces (i.e., each individual light) included in the traffic light. In this regard, the signal-face information may include the location of a signal face within the traffic light (e.g., in relation to the other signal faces), the color of a signal face when activated, and the shape or symbol of a signal face when activated. Like the orientation information for the traffic light, signal-face information may be derived using computer-vision and/or machine learning techniques. However, as discussed above, it may not be possible to derive a complete set of signal-face information for a traffic light at the time that the traffic light is initially detected. The reason for this is that a signal face typically needs to be activated in order for its color and shape to be detected from sensor data, and it may be the case that only a subset of the traffic light's signal faces may be activated during the timeframe that the traffic light is initially detected.

Other examples of traffic light-specific information are also possible, as well as information that is specific to other types of stationary elements. Further, it should also be understood that, for each type of information discussed above for a newly-detected stationary element, the information may have an associated confidence level that represents an estimated likelihood of accuracy of the information. For example, a signal face of a traffic light that is defined based on being observed with the captured sensor data may be initially assigned a relatively high confidence level, representing a relatively high likelihood of accuracy.

As shown at block 203 in FIG. 2, the example framework may next involve evaluating whether the newly-detected stationary element is semantically related to any other stationary elements in the real-world environment, which may provide a basis to infer additional information about the newly-detected element.

The evaluation of whether the newly-detected stationary element is semantically related to any other stationary elements may be performed using any of various techniques, including but not limited to techniques that are based on machine learning models and/or computer vision techniques. For instance, as one possible implementation, the evaluation of whether the newly-detected stationary element is semantically related to any other stationary elements may be performed using one or more machine learning models that have each been trained to detect that a stationary element of a first type is semantically related to a stationary element of a second type based on the spatial relationship between the stationary elements of those two types (e.g., the relative location of the stationary element of the second type vis-à-vis the stationary element of the first type) and perhaps other contextual information that is available for the stationary elements of the first and/or second types (e.g., other stationary elements that are in proximity to the stationary elements of the first and/or second types). In this respect, the training data for such a machine learning model may comprise sensor data representative of real-world environments (e.g., image data and/or LiDAR data) that has been labeled to indicate instances of semantic relationships between stationary elements of the first type and stationary elements of the second type (e.g., labels indicating that certain traffic lights appearing in sensor data are semantically related to certain traffic signs appearing in such senor data). In such an implementation, the evaluation may involve the use of a separate machine learning model for each possible type of semantic relationship that could be detected. For example, the evaluation may be performed using a first set of machine learning models that have each been trained to detect a semantic relationship between a traffic light and a respective type of stationary element (e.g., different types of traffic signs, a traffic lane, etc.), a second set of machine learning models that have each been trained to detect a semantic relationship between a traffic lane and a respective type of stationary element, and so on.

In practice, the evaluation of whether the newly-detected stationary element is semantically related to any other stationary elements may generally involve a search for certain types of stationary elements that have a particular spatial relationship with the newly-detected stationary element. Depending on the type of newly-detected stationary element, this evaluation may take various forms.

For example, if the new stationary element is a traffic light, the evaluation may search for other nearby stationary elements that could be semantically related to the traffic light, such as certain types of traffic signs that are located at or near the intersection where the traffic light is located, which may include traffic signs that are located on a particular side of the road approaching the intersection and/or traffic signs that are affixed to a traffic light pole at a particular position relative to the traffic light. Further, the evaluation may search for traffic signs that are located in a given direction relative to the traffic light (e.g., to the right or left of the traffic light), and/or within a threshold distance of the traffic light. Still further, the evaluation may additionally search for traffic signs that are oriented in a similar direction as the traffic light (e.g., within 15 degrees of the orientation of the traffic light). Various other possibilities also exist, including one or more of the criteria above alone or in combination.

As another example, if the newly-detected stationary element is a traffic lane, the evaluation may search for other nearby stationary elements that could be semantically related to the traffic lane, such as certain types of traffic signs that are adjacent to the traffic lane, and/or traffic lights that are positioned and oriented in a way that indicates a semantic relationship with the new traffic lane.

As yet another example, if the newly-detected stationary element is a parking lane, the evaluation may search for other nearby stationary elements that could be semantically related to the parking lane, such as certain types of traffic signs that are adjacent to the parking lane, certain types of curb markings along the length of the parking lane, and/or certain types of objects that are adjacent to the parking lane and have an impact on parking restrictions (e.g., hydrants and bus stops).

As still another example, if the newly-detected element is a bus stop, the evaluation may search for other nearby stationary elements that could be semantically related to the bus stop, such as certain types of traffic signs in proximity to the bus stop.

In some implementations, the evaluation may consider prior trajectories of other agents, which may be encoded within the map of the real-world environment, to determine whether movements patterns indicate a semantic relationship between one or more of the elements noted above.

The function of evaluating whether the newly-detected stationary element is semantically related to any other stationary elements in the real-world environment may take various other forms as well. Further, it should be understood that the evaluation of the other stationary elements in the real-world environment may be performed based on sensor data for the real-world environment, map data for the real-world environment, or some combination thereof.

At block 204, based on the evaluation of whether the newly-detected stationary element is semantically related to any other stationary elements (e.g., after evaluating one or more candidate stationary elements within the real-world environment), the example framework involves detecting a semantic relationship between the newly-detected stationary element and at least one stationary element in the real-world environment. For instance, based on the type of evaluation described above with reference to block 203, it may be determined that a certain type of stationary element is spatially positioned relative to the newly-detected stationary element in a manner that is indicative of a semantic relationship with the newly-detected stationary element.

At block 205, after detecting the semantic relationship between the newly-detected stationary element and the at least one stationary element in the real-world environment, the example framework may then infer additional information about the newly-detected stationary element based on that detected semantic relationship. The additional information may be inferred using any of various techniques, including but not limited to techniques that are based on one or more machine learning models or the like. In this regard, the same machine learning models discussed above with respect to block 203 may be configured to output the inferred information when a semantic relationship is detected, although other examples involving separate machine learning models are also possible. In practice, the function of inferring the additional information about the newly-detected stationary element may take various forms, which may depend on one or both of the type of newly-detected stationary element and the type of related stationary element.

As one example, if the newly-detected stationary element is a traffic light and the related stationary element is a traffic sign, inferring the additional information about the traffic light based on the detected semantic relationship may involve (i) determining the meaning of the traffic sign, which may involve performing pictogram analysis and/or text recognition on the traffic sign, and then (ii) based on the determined meaning of the traffic sign, inferring information that is applicable to the traffic light. In this respect, one example type of information that may be inferred from the determined meaning of the traffic sign may take the form of inferred information about traffic rules that are applicable to the newly-detected traffic light and/or its signal faces, such as turn restrictions, which the traffic sign may indicate are only applicable at certain times of the day or on certain days of the week. Another example type of information that may be inferred from the determined meaning of the traffic sign may take the form of inferred information about the signal faces of the traffic light, which may confirm or supplement signal-face information determined from the sensor data that is representative of the traffic light (e.g., it may be inferred from a related traffic sign that the traffic light includes a green left arrow, which may or may not have been detected within the sensor data for the traffic light). Yet another example type of information that may be inferred from the determined meaning of the traffic sign may take the form of inferred information about the lane or lanes controlled by the traffic light (e.g., it may be inferred from a related traffic sign that the traffic light controls the left lane of the intersection). Other types of information about a traffic light may be also inferred based on a detected semantic relationship with a traffic sign.

As another example, if the newly-detected stationary element is a traffic light and the related stationary element is a lane, inferring the additional information about the traffic light based on the detected semantic relationship may involve using the spatial relationship between the traffic light and the lane (e.g., the position and orientation of the traffic lane relative to the position and orientation of the traffic light) to infer that the traffic light and/or a particular signal-face of the traffic light controls the traffic lane. Notably, a similar inference could be made, in reverse, if the newly-detected stationary element is a lane and the related stationary element is a traffic light. Further, it should be understood that other information about the traffic light and/or the lane may be used when inferring information based on the detected semantic relationship, examples of which may include signal-face information for the traffic light and/or information regarding the type of lane. For instance, if the traffic light includes a given signal-face related to bicyclists and the lane is determined to be a bike lane, it may be inferred that the given signal-face of the traffic light controls the lane. Other types of information about a traffic light may be also inferred based on a detected semantic relationship with a lane (or vice versa).

As yet another example, if the newly-detected stationary element is a lane and the related stationary element is a traffic sign, inferring the additional information about the lane based on the detected semantic relationship may involve (i) determining the meaning of the traffic sign, which may involve performing pictogram analysis and/or text recognition on the traffic sign, and then (ii) based on the determined meaning of the traffic sign, inferring information that is applicable to the lane. In this respect, the information about the lane that may be inferred from the determined meaning of the traffic sign may take the form of traffic rules governing the lane, such as speed limits, parking restrictions (e.g., time-based parking restrictions), passing restrictions, and/or usage restrictions for the lane based on vehicle occupancy (e.g., a carpool lane that cannot be used by vehicles with fewer than two passengers), among various other possibilities.

As still another example, if the newly-detected stationary element is a lane and the related stationary element is a curb marking, inferring the additional information about the lane based on the detected semantic relationship may involve (i) determining the meaning of the curb marking, which may involve determining a color of the curb marking, performing pictogram analysis, and/or text recognition on the curb marking, and then (ii) based on the determined meaning of the curb marking, inferring information that is applicable to the lane. In this respect, the information about the lane that may be inferred from the determined meaning of the curb marking may take the form of traffic rules governing the lane, such as parking restrictions, pickup and drop-off restrictions, among various other possibilities.

As a further example, if a newly-detected lane is a parking lane and the related stationary element is an object adjacent to the parking lane that has an impact on parking restrictions, such as a fire hydrant or bus stop, inferring the additional information about the parking lane based on the detected semantic relationship may involve inferring information about parking restrictions for the parking lane (e.g., the position of the given parking restriction within the parking lane) based on the type and location of the related object.

As still a further example, if the newly-detected stationary element is a bus stop and the related stationary element is a traffic sign, inferring the additional information about the bus stop based on the detected semantic relationship may involve (i) determining the meaning of the traffic sign, which may involve performing pictogram analysis and/or text recognition on the traffic sign, and then (ii) based on the determined meaning of the traffic sign, inferring information that is applicable to the bus stop. In this respect, the information about the bus stop that may be inferred from the determined meaning of the traffic sign may take the form of traffic rules related to the bus stop and/or contextual information about the bus stop (e.g., bus numbers that are scheduled to stop at the bus stop).

For each of the examples above, and others, it should be noted that the information about the at least one related stationary element that is used to infer additional information about the newly-detected stationary element may be determined based on sensor data for the real-world environment (e.g., by applying computer-vision, machine-learning, and/or data processing techniques to the sensor data that is representative of the at least one related stationary element), map-data for the real-world environment (to the extent certain information about the at least one related stationary element is already encoded into a map for the real-world environment), or some combination thereof.

At block 206, after the additional information about the newly-detected stationary element has been inferred based on the detected semantic relationship with the at least one other stationary element, the initial set of information for the newly-detected stationary element may be updated to include this additional information. In this regard, the function of updating the initial set of information with this additional information may involve appending the additional information to the information that was previously included in the initial set of information and/or updating certain information that was previously included in the initial set of information.

Like the initial set of information that is defined for the newly-detected stationary element, the information that is inferred based on the related stationary element may also be associated with a given confidence level that represents an estimated likelihood of accuracy of the information. However, the confidence level associated with the inferred information may be relatively lower than information that is derived based on direct observation within the sensor data. Nonetheless, in some cases, updating the initial set of information to include the additional inferred information may involve updating the confidence level of some types of information that were included in the initial set of information. For instance, the inferred information may serve as a verification of other types of derived information. Other examples of updating the initial set of information with the additional inferred information are also possible.

At block 207, the example framework may involve storing the updated set of information about the newly-detected stationary element such that it is available for future use. In this regard, the updated set of information about the newly-detected stationary element may subsequently be used for various purposes. For instance, as one possibility, the updated set of information about the newly-detected stationary element may be encoded into a map that is representative of the real-world environment, which may provide various advantages as described in detail above. As another possibility, the updated set of information about the newly-detected stationary element may be used as training data for one or more machine-learning models (or the like) that are configured to derive and/or predict information about other comparable stationary elements (e.g., stationary elements of a same type as the newly-detected stationary element) that are encountered in the real world, which may provide various advantages as described in detail above. The updated set of information about the newly-detected stationary element may be used for other purposes as well.

In some implementations as otherwise discussed herein, the example framework may also be utilized after the initial detection of the stationary element to further update the set of information for that stationary element based on additional sensor data that becomes available for the real-world environment. Depending on the type of stationary element, this function may take various forms.

For example, in the case of a traffic light, additional sensor data that is collected over time may be used to identify each of the traffic light's signal faces once each signal face has been captured in its active state. This may improve the completeness of the signal-face information for the traffic light, which in turn may increase the confidence level associated with the traffic light.

As another example, additionally collected sensor data over a period of time may be used to determine the activation sequence of the traffic light's signal faces, including whether the activation sequence varies at different times of the day. Similarly, based on enough additional captured sensor data, it may be possible to determine the length of each signal phase during which a given signal face is activated. The length of all signal phases in combination may allow for the determination of the overall cycle length of the traffic light. As with the activation sequence, it may also be possible to determine whether the length of any individual signal phases and/or the overall cycle time varies at different times of the day.

In this way, further updates to the determined set of information for that stationary element may lead to further improvements in one or more of the areas discussed above (e.g., vehicle behavior planning, route selection, ETA optimization, matching optimization, pre-positioning, etc.).

Although the example framework shown in FIG. 2A and discussed above is generally presented in the context of determining information about a stationary element that has been newly-detected within captured sensor data, it should also be understood that the example framework may also be used to determine additional information about a stationary element that was previously detected and encoded into a map. For instance, a stationary element such as a traffic light may have been previously encoded into a map, but the data structure for that traffic light may include only a basic set of information, such as classification and position information, but lacks some of the more-detailed semantic information discussed above.

Figure 2B:
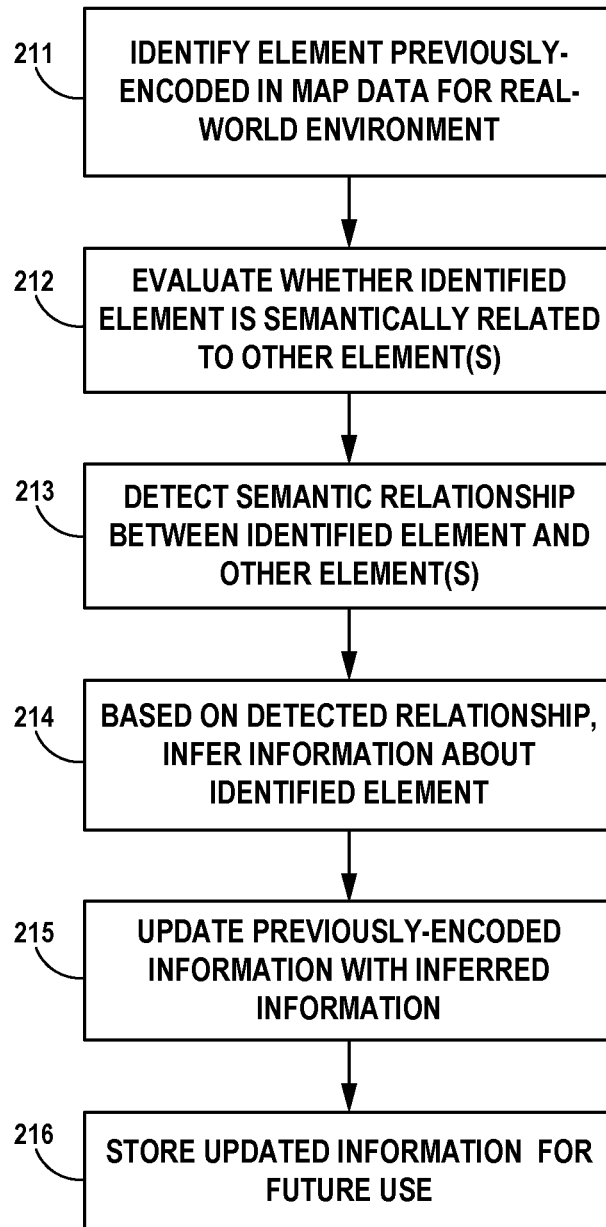
FIG. 2B is a diagram that illustrates another example of a framework that incorporates the disclosed technique for determining information about stationary elements in the real word.

FIG. 2B shows an example of using the framework in this way, beginning at block 211 with the identification of an element that was previously detected and encoded within the map data for the real-world environment. In this respect, the example framework may also be used to evaluate whether to supplement the previously-encoded information for certain stationary elements within a map. For instance, using the example framework in this way may involve evaluating, at block 212, whether the previously-encoded stationary element is semantically related to any other stationary element(s) in the real-world environment within the map, which may involve the use of one or more machine learning models trained to detect semantic relationships between elements, as discussed above.

At block 213, based on the evaluation, a semantic relationship may be detected between the previously-encoded stationary element and at least one other stationary element within the map. At block 214, based on this determined semantic relationship, additional information about the previously-encoded stationary element may be inferred. For example, inferring the additional information might involve accessing the encoded map data for the related stationary element. Additionally or alternatively, the underlying sensor data for the related stationary element may also be used to infer the additional information. At block 215, the previously-encoded set of information for the identified stationary element may then be updated to include the additional inferred information, as noted in the examples above. For instance, updating the previously-encoded set of information may involve updating the confidence level of some types of information therein. Lastly, at block 216, the updated information for the identified element may be stored for future use, as discussed above.

Figure 3A:
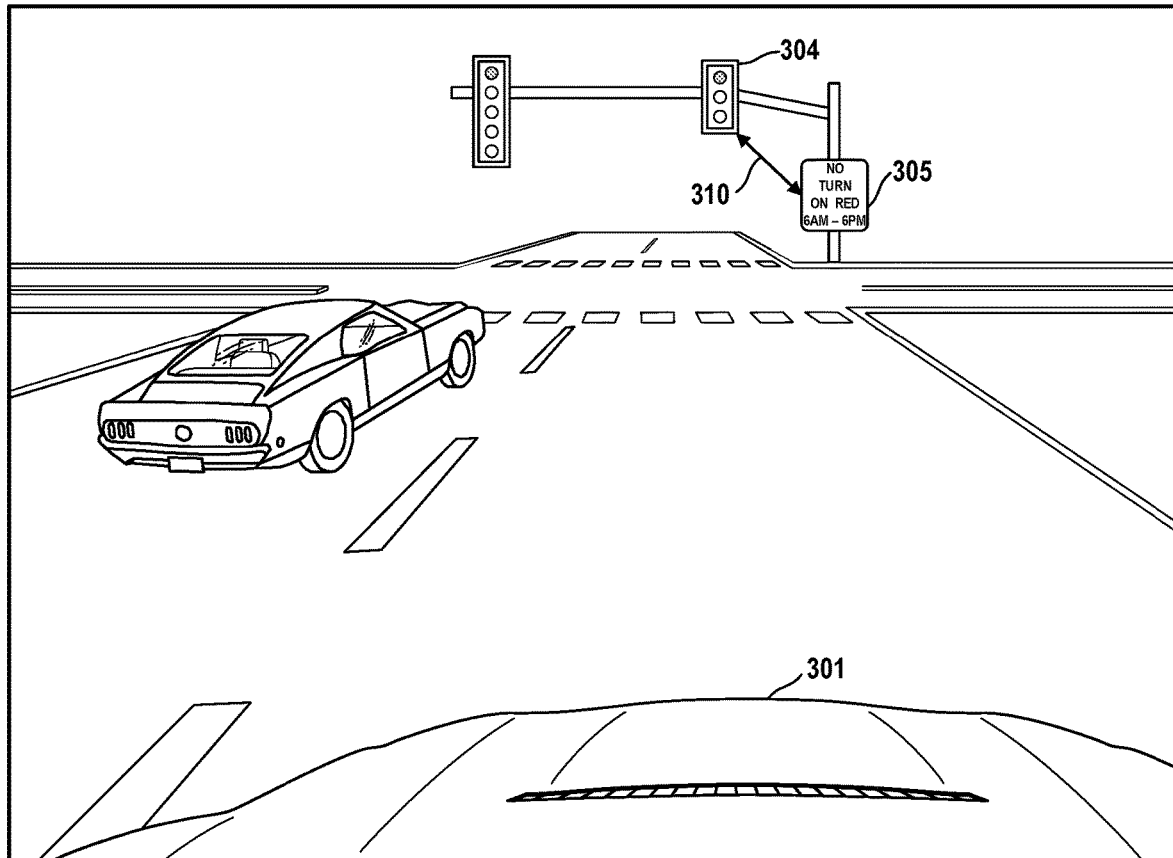
FIG. 3A is a diagram that illustrates one example of a vehicle determining information about a traffic light.
Figure 3A:
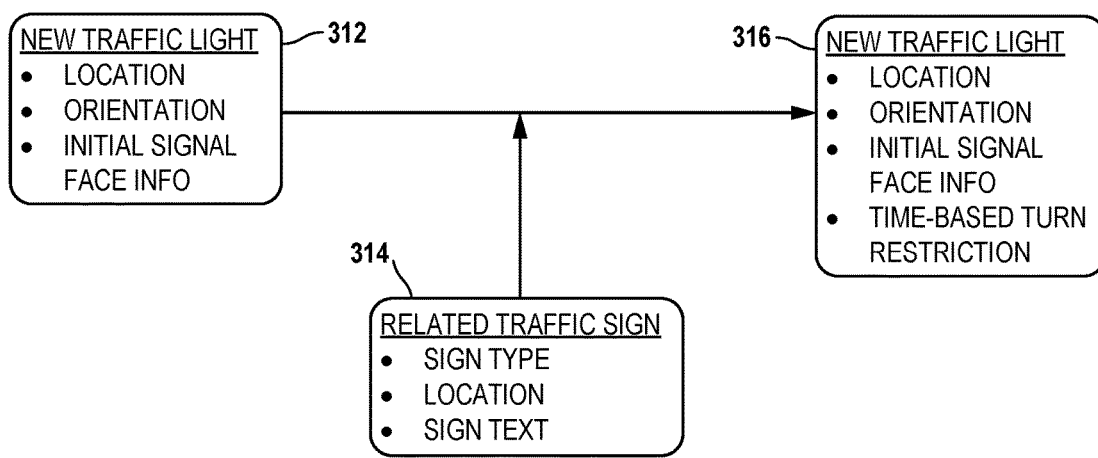
Figure 3B:
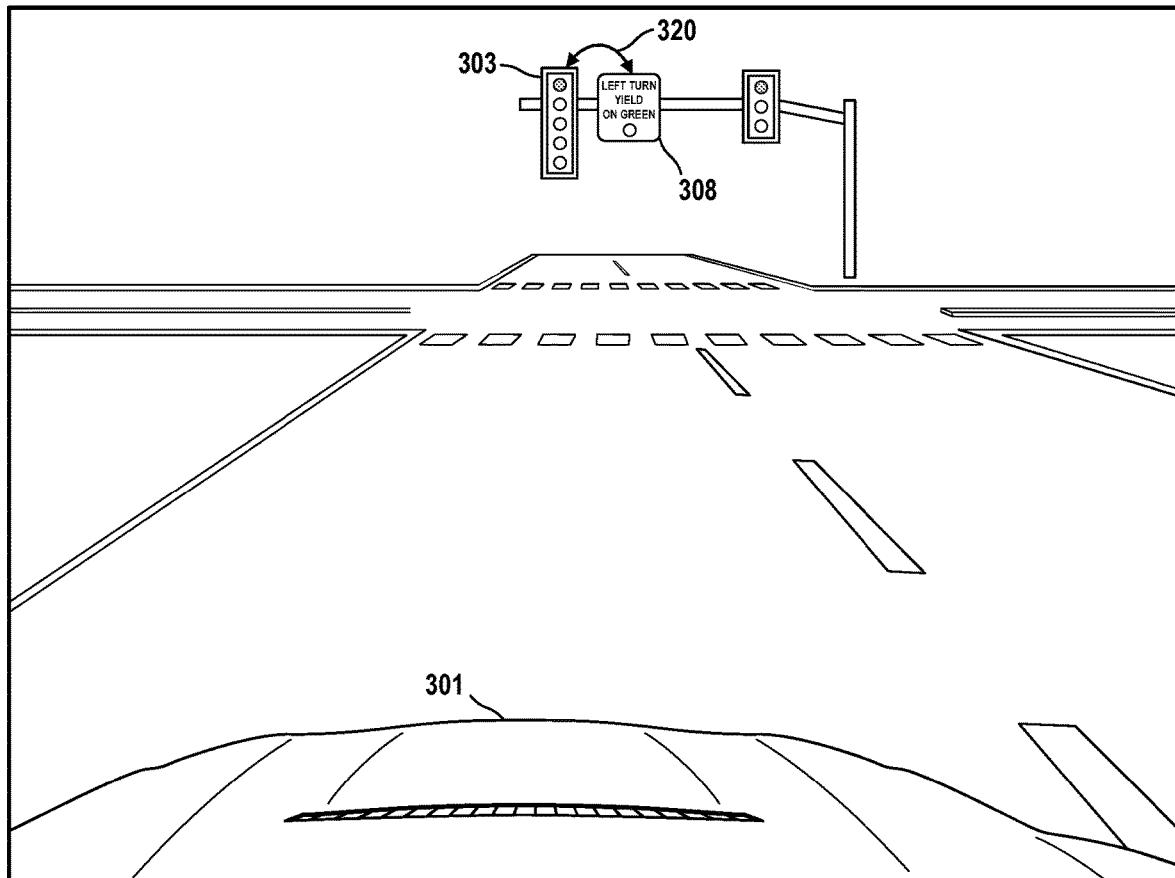
FIG. 3B is a diagram that illustrates another example of a vehicle determining information about a traffic light.
Figure 3B:
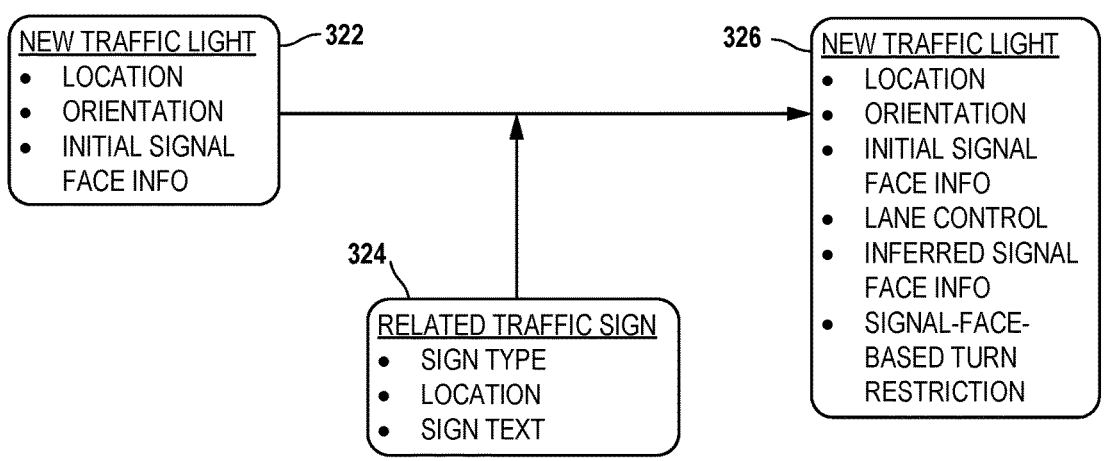
Figure 3C:
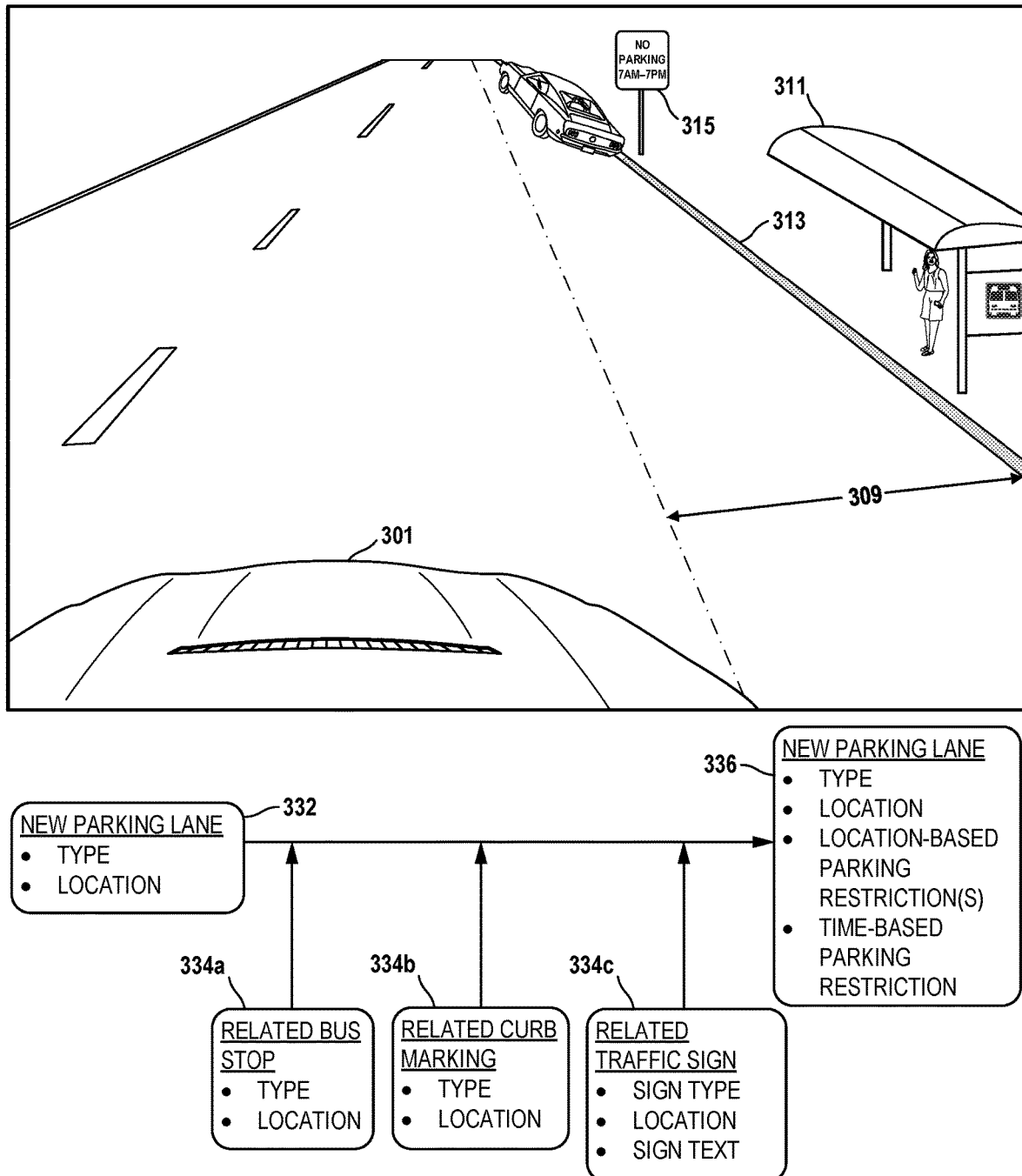
FIG. 3C is a diagram that illustrates one example of a vehicle determining information about a parking lane.

Several illustrative, real-world examples of how the disclosed technique may be used to determine information about stationary elements in the real word will now be described with reference to FIGS. 3A-3C. Further, although the operations discussed in relation to FIGS. 3A-3C are generally presented as being carried out by an on-board computing system of a vehicle 301, it should be understood that other possibilities also exist. For instance, the operations discussed in relation to FIGS. 3A-3C may be performed in whole or in part by an off-vehicle computing platform using data collected from one or more sensor-equipped vehicles within a fleet of vehicles operating as part of a transportation-matching platform, among other examples.

Beginning with FIG. 3A, an example scenario is shown in which a vehicle 301 is approaching an intersection that includes a traffic light 304. For the purposes of FIG. 3A, it will be assumed that the traffic light 304 was not previously encoded into the map that is available to the vehicle 301.

As it approaches the intersection, the vehicle 301 may capture sensor data that is representative of the area shown in FIG. 3A and compare it to the available map data for the area, as discussed above. Based on this comparison, the vehicle 301 determines that the map does not contain a stationary element that corresponds to the traffic light 304, and thus the vehicle 301 may determine that the traffic light 304 is new.

Accordingly, the vehicle 301 may define an initial set of information about the traffic light 304 based on the captured sensor data that is representative of the traffic light 304. The initial set of information may include a location of the traffic light 304 within the 3D reference frame of the map, an orientation of the traffic light 304 that indicates what direction it is facing, and information regarding the signal faces of the traffic light 304. In this regard, the vehicle 301 may determine that the traffic light 304 has three signal faces vertically arranged, and that the currently-active, top-most signal face is solid red. The initial set of information may include other types of information as well. This initial set of information is shown schematically as the data structure 312 in FIG. 3A.

Further, based on the detection of the traffic light 304 as a new stationary element, the vehicle 301 may evaluate whether the traffic light 304 has a semantic relationship with any other stationary elements in the given area. For instance, the vehicle 301 may utilize one or more machine-learning models to search the map as well as its captured sensor data for certain types of stationary elements, such as traffic signs, that are spatially located in areas that are indicative that the traffic sign is semantically related to the traffic light. Accordingly, the vehicle 301 determines that the traffic sign 305, which reads "No Turn on Red 6 AM-6 PM," has a semantic relationship with the traffic light 304 based on certain information, such as the type of traffic sign, the location of the traffic sign, and the text of the traffic sign. This information is shown schematically in data structure 314.

Based on the detected semantic relationship between the traffic light 304 and the traffic sign 305, indicated by way of illustration as an arrow 310 in FIG. 3A, the vehicle 301 may infer additional information about the traffic light 304. This may involve first determining the meaning of the traffic sign 305 (e.g., using pictogram analysis/text recognition) and then inferring information that is applicable to the traffic light 304 based on the determined meaning. For instance, the vehicle 301 may infer that the traffic light 304 has an associated turning restriction that is in force during certain times of the day, but not others. Further, the vehicle 301 may infer that the turning restriction controls a particular lane of the roadway (i.e., the right lane).

The vehicle 301 may then update the initial set of information that it defined for the traffic light 304 to include the additional information that it inferred from the traffic sign 305. Accordingly, the vehicle 301 may define an updated set of information, as shown schematically by the data structure 316. In some cases, this may involve appending the initially defined set of information for the traffic light 304 with the additional inferred information. In other cases, updating the initial set of information may involve updating a confidence level for certain types of information. For example, the vehicle 301 may initially determine, with a relatively-high degree of confidence, that the traffic light 304 includes a solid red signal face as its top-most signal face, based on its activated state within the captured sensor data. Based on the semantic relationship with the traffic sign 305, the vehicle 301 may increase the confidence level in this information based on the reference to the red signal face in traffic sign 305, which serves as verification of the initially defined information.

After updating the initial set of information for traffic light 304 to include the additional inferred information, the vehicle 301 may store the updated set of information for future use. In practice, storing the updated set of information may take various forms. For example, the example shown in FIG. 3A has been generally discussed as being carried out by an on-board computing system of vehicle 301. In this regard, the vehicle 301 may initially store the updated set of information for the traffic light 304 in an on-vehicle computing platform that performed some or all of the other functions described above, which may include effecting an update to the map that is used by the vehicle 301. Additionally or alternatively, the vehicle 301 may cause the updated set of information for the traffic light 304 to be stored by an off-vehicle computing platform, which may facilitate the distribution of the updated set of information as a map update to other vehicles and computing platforms (e.g., a transportation-matching platform) that might make use of such information for improved behavior planning, route selection, ETA optimization, matching individuals with available vehicles, and the like, as noted above. Numerous other possibilities exist.

Turning to FIG. 3B, another example scenario is shown in which the vehicle 301 is approaching an intersection that includes a traffic light 303. As above, for the purposes of FIG. 3B, it will be assumed that the traffic light 303 was not previously encoded into the map that is available to the vehicle 301.

As it approaches the intersection, the vehicle 301 may capture sensor data that is representative of the area shown in FIG. 3B and compare it to the available map data for the area, as discussed above. Based on this comparison, the vehicle 301 determines that the map does not contain a stationary element that corresponds to the traffic light 303, and thus the vehicle 301 may determine that the traffic light 303 is new.

Like the example shown in FIG. 3A, the vehicle 301 shown in FIG. 3B may define an initial set of information about the traffic light 303 based on the captured sensor data that is representative of the traffic light 303. The initial set of information may include a location of the traffic light 303 within the 3D reference frame of the map, an orientation of the traffic light 303 that indicates what direction it is facing, and information regarding the signal faces of the traffic light 303. In this regard, the vehicle 301 may determine that the traffic light 303 has five signal faces vertically arranged, and that the currently-active, top-most signal face is solid red. The initial set of information may include other types of information as well. This initial set of information is shown schematically as the data structure 322 in FIG. 3B.

Based on the detection of the traffic light 303 as a new stationary element, the vehicle 301 may evaluate whether the traffic light 303 has a semantic relationship with any other stationary elements in the given area. For instance, the vehicle 301 may search the map as well as its captured sensor data for certain types of stationary elements, such as traffic signs, that are spatially located in areas that are indicative that the traffic sign is semantically related to the traffic light. Accordingly, the vehicle 301 determines that the traffic sign 308, which reads "Left Turn Yield on Green" followed by a symbol of a solid green signal face, has a semantic relationship with the traffic light 303 based on certain information, such as the type of traffic sign, the location of the traffic sign, and the text of the traffic sign. This information is shown schematically in data structure 324.

Based on the detected semantic relationship between the traffic light 303 and the traffic sign 308, indicated by way of illustration as an arrow 320 in FIG. 3B, the vehicle 301 may infer additional information about the traffic light 304. This may involve first determining the meaning of the traffic sign 308 (e.g., using pictogram analysis/text recognition) and then inferring information that is applicable to the traffic light 303 based on the determined meaning. For instance, the vehicle 301 may infer that the traffic light 303 controls the left lane of the roadway. Further, the vehicle 301 may infer that the traffic light 303 includes a solid green signal face, even though there is no indication that a solid green signal face was active in the captured sensor data for the traffic light 303. Still further, the vehicle 301 may infer that the traffic light 303 has a turning restriction, and further, that the turning restriction changes based on the active signal face of the traffic light 303. In particular, when the solid green signal face is active, vehicles in the left lane should yield to oncoming traffic before turning left.

The vehicle 301 may then update the initial set of information that it defined for the traffic light 303 to include the additional information that it inferred from the traffic sign 308. Accordingly, the vehicle 301 may define an updated set of information, as shown schematically by the data structure 326. In some cases, this may involve appending the initially defined set of information for the traffic light 303 with the additional inferred information. In other cases, updating the initial set of information may involve updating a confidence level for certain types of information.

For example, the vehicle 301 may initially define a set of information that includes an indication that the traffic light 303 includes a solid green signal face. However, this information may have a relatively low level of confidence because a solid green signal face was not actually observed in the sensor data for the traffic light 303. Nonetheless, based on the detected semantic relationship with the traffic sign 308, the vehicle 301 may update the information for the traffic light 303 to increase the confidence level associated with the traffic light 303 including a solid green signal face.

After updating the initial set of information for traffic light 303 to include the additional inferred information, the vehicle 301 may store the updated set of information for future use. As noted above, storing the updated set of information may take various forms, including storing the updated set of information for the traffic light 303 in an on-vehicle computing platform and/or causing the updated set of information for the traffic light 303 to be stored by an off-vehicle computing platform, which may facilitate the distribution of the updated set of information as a map update to other vehicles and computing platforms (e.g., a transportation-matching platform) that might make use of such information for improved behavior planning, route selection, ETA optimization, matching individuals with available vehicles, and the like, as noted above.

Referring now to FIG. 3C, another example scenario is shown in which the vehicle 301 is driving along a roadway that has been widened to include a new parking lane 309. Accordingly, the vehicle 301 may capture sensor data that is representative of the area shown in FIG. 3C and compare it to the available map data for the area, as discussed above. Based on this comparison, the vehicle 301 determines that the map does not contain a stationary element that corresponds to the parking lane 309, and thus the vehicle 301 may determine that the parking lane 309 is new.

Accordingly, the vehicle 301 may define an initial set of information about the parking lane 309 based on the captured sensor data that is representative of the parking lane 309. The initial set of information may include a location of the parking lane 309 within the 3D reference frame of the map. As another example, although the parking lane 309 is delineated for reference with a dashed line in FIG. 3C, the parking lane 309 may not include any pavement markings, such as those shown between the other lanes in FIG. 3C. Based on this information, the vehicle 301 may determine a lane type for the parking lane 309—in particular, that it is a parking lane rather than a lane intended for ongoing traffic. The initial set of information defined by the vehicle 301 is shown schematically as the data structure 332 in FIG. 3C, and may include other types of information as well.

Based on the detection of the parking lane 309 as a new stationary element, the vehicle 301 may evaluate whether the parking lane 309 has a semantic relationship with any other stationary elements in the given area. For instance, the vehicle 301 may search the map as well as its captured sensor data for certain types of stationary elements that are spatially located in areas that are indicative of a semantic relationship with the parking lane 309. In doing so, the vehicle 301 determines that there are multiple stationary elements that are semantically related to the parking lane 309, based on information derived for each element. For example, the vehicle may determine that a bus stop 311 is semantically related to the parking lane 309 based on information such as a derived type and location for the bus stop 311, as shown schematically in data structure 334a. In addition, the vehicle 301 may determine that a curb marking 313 is semantically related to the parking lane 309 based on information such as a derived type and location for the curb marking 313, as shown schematically in data structure 334b. As yet another example, the vehicle 301 may determine that a traffic sign 315 that reads "No Parking 7 AM-7 PM," is semantically related to the parking lane 309 based on information such as a derived type, location, and text for the traffic sign 315, as shown schematically in data structure 334c.

Based on the detected semantic relationship between the parking lane 309 and each of the related elements noted above, the vehicle 301 may infer additional information about the parking lane 309. For instance, the vehicle 301 may infer that the parking lane 309 has a parking restriction directly adjacent to the bus stop 311. In addition, the vehicle 301 may infer additional information about the extent of the parking restriction that is related to the bus stop 311. For example, the vehicle 301 may infer from the curb marking 313 the extent to which the parking restriction extends beyond the bus stop 311, which might not otherwise be apparent based only on the location of the bus stop 311. As another possibility, the vehicle 301 may first determine the meaning of the traffic sign 315 (e.g., using pictogram analysis/text recognition) and then infer information that is applicable to the parking lane 309 based on the determined meaning. For instance, the vehicle 301 may infer that the parking lane 309 has an additional parking restriction, associated with a different location of the parking lane, that is in force during certain times of the day, but not others.

Based on the above, the vehicle 301 may update the initial set of information that it defined for the parking lane 309 to include the additional information that it inferred from the related elements shown in FIG. 3C. Accordingly, the vehicle 301 may define an updated set of information, as shown schematically in the data structure 336. As above, this may involve appending the initially defined set of information for the parking lane 309 with the additional inferred information, or it may involve updating a confidence level for certain types of the originally defined information, or a combination of both.

After updating the initial set of information for parking lane 309 to include the additional inferred information, the vehicle 301 may store the updated set of information for future use. As noted above, storing the updated set of information may take various forms, including storing the updated set of information for the parking lane 309 in an on-vehicle computing platform and/or causing the updated set of information for the parking lane 309 to be stored by an off-vehicle computing platform, which may facilitate the distribution of the updated set of information as a map update to other vehicles and computing platforms (e.g., a transportation-matching platform) that might make use of such information for improved behavior planning, route selection, ETA optimization, matching individuals with available vehicles, and the like, as noted above. As one example, a transportation-matching platform may use the updated set of information for the parking lane 309 to determine improved locations for pickups and drop-offs of transportation requestors along parking lane 309. For instance, the transportation-matching platform may determine a location for a vehicle to perform a pickup or drop-off along parking lane 309 that is outside the parking restriction indicated by the related curb marking 313, which may reduce the likelihood that the vehicle disrupts bus traffic and may increase safety of the transportation requestor entering or exiting the vehicle. Numerous other possibilities exist.

The foregoing framework for determining information about stationary elements in the real word may be used in various other scenarios, and for various other purposes as well.

Figure 4:
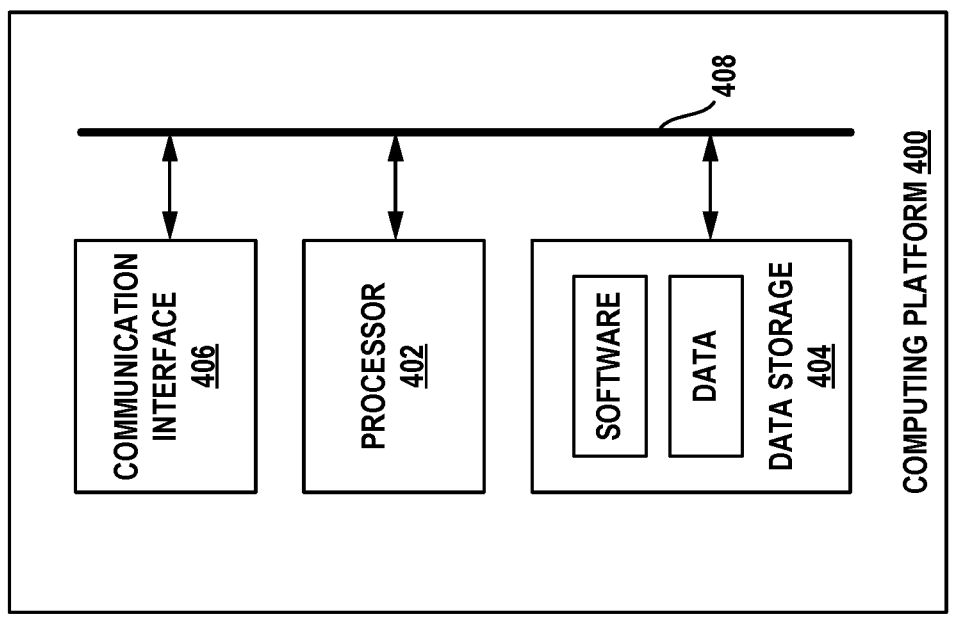
FIG. 4 is a simplified block diagram that illustrates some structural components that may be included in an example computing platform.

Turning now to FIG. 4, a simplified block diagram is provided to illustrate some structural components that may be included in an example computing platform 400, which may be configured to carry out any of various functions disclosed herein. At a high level, computing platform 400 may generally comprise any one or more computer systems (e.g., an on-board vehicle computing system and/or one or more off-board servers) that collectively include at least a processor 402, data storage 404, and a communication interface 406, all of which may be communicatively linked by a communication link 408 that may take the form of a system bus, a communication network such as a public, private, or hybrid cloud, or some other connection mechanism. Each of these components may take various forms.

For instance, processor 402 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 402 could comprise processing components that are distributed across a plurality of physical computing devices connected via a network, such as a computing cluster of a public, private, or hybrid cloud.

In turn, data storage 404 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 404 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 4, data storage 404 may be capable of storing both (i) program instructions that are executable by processor 402 such that computing platform 400 is configured to perform any of the various functions disclosed herein (including but not limited to any the functions described with reference to FIGS. 2A-2B and 3A-3C), and (ii) data that may be received, derived, or otherwise stored by computing platform 400.

Communication interface 406 may take the form of any one or more interfaces that facilitate communication between computing platform 400 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 400 may additionally include one or more input/output (I/O) interfaces that are configured to either (i) receive and/or capture information at computing platform 400 and (ii) output information from computing platform 400 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 400 is one example of a computing platform that may be used with the embodiments described herein. Numerous other arrangements are possible and contemplated herein. For instance, other computing platforms may include additional components not pictured and/or more or less of the pictured components.

As noted above, although various different types of sensor-equipped vehicles may be utilized to collect sensor data within the disclosed framework, one possible use case for the updated maps is to facilitate autonomous operation of a vehicle. In view of this, one possible example of such a vehicle will now be discussed in greater detail.

Figure 5:
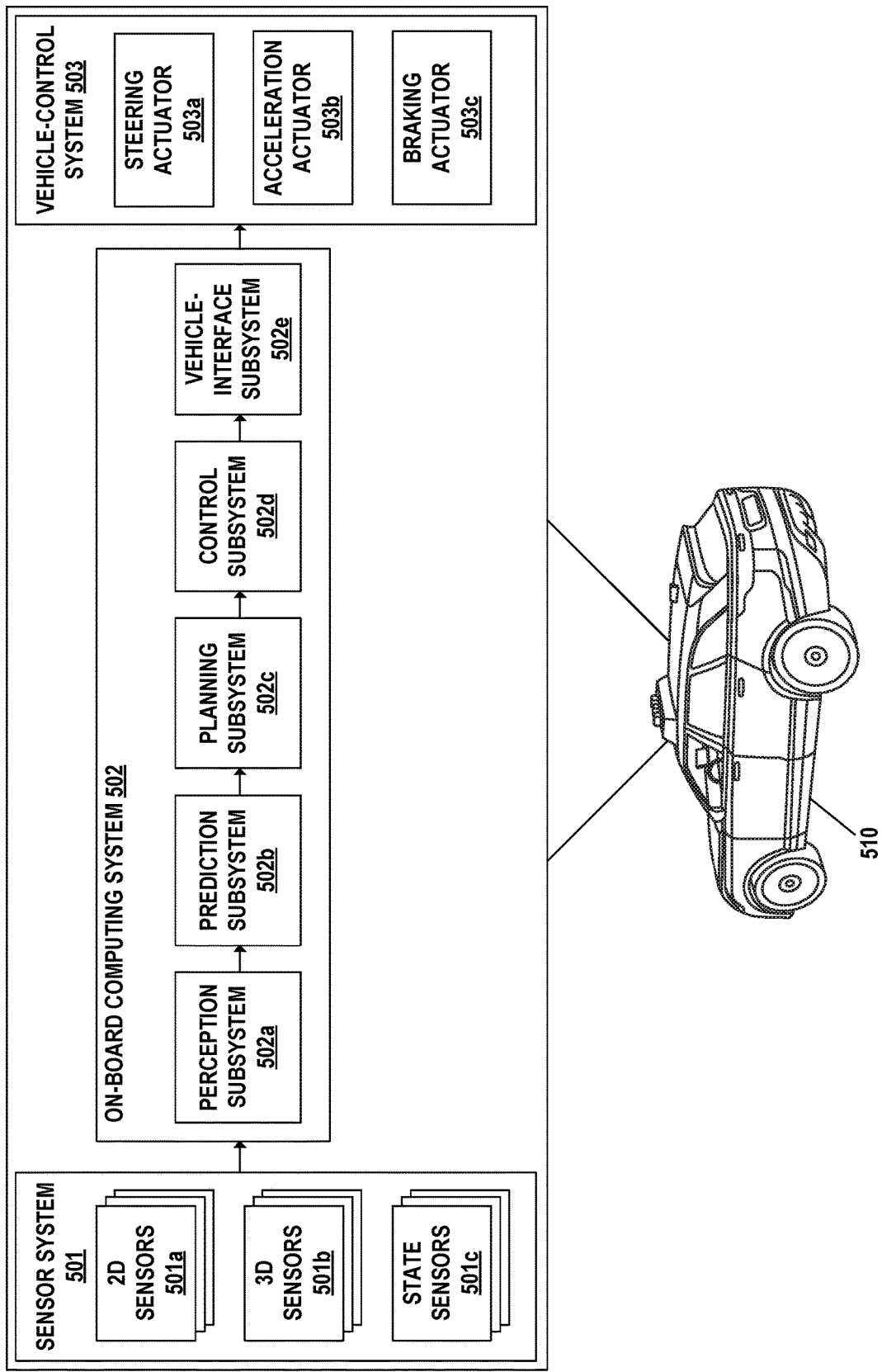
FIG. 5 is a simplified block diagram that illustrates certain systems that may be included in an example vehicle.

Turning now to FIG. 5, a simplified block diagram is provided to illustrate certain systems that may be included in an example vehicle 600. As shown, at a high level, vehicle 600 may include at least (i) a sensor system 501 that is configured to capture sensor data that is representative of the real-world environment being perceived by the vehicle (i.e., the collection vehicle's "surrounding environment") and/or the collection vehicle's operation within that real-world environment, (ii) an on-board computing system 502 that is configured to perform functions related to autonomous operation of vehicle 600 (and perhaps other functions as well), and (iii) a vehicle-control system 503 that is configured to control the physical operation of vehicle 600, among other possibilities. Each of these systems may take various forms.

In general, sensor system 501 may comprise any of various different types of sensors, each of which is generally configured to detect one or more particular stimuli based on vehicle 600 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more 2D sensors 501a that are each configured to capture 2D data that is representative of the vehicle's surrounding environment. Examples of 2D sensor(s) 501a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 501 may include one or more 3D sensors 501b that are each configured to capture 3D data that is representative of the vehicle's surrounding environment. Examples of 3D sensor(s) 501b may include a LiDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 501 may include one or more state sensors 501c that are each configured to detect aspects of the vehicle's current state, such as the vehicle's current position, current orientation (e.g., heading/yaw, pitch, and/or roll), current velocity, and/or current acceleration of vehicle 600. Examples of state sensor(s) 501c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 600 (e.g., sensor system 501, vehicle-control system 503, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 600 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 600, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 5, in one embodiment, the functional subsystems of on-board computing system 502 may include (i) a perception subsystem 502a that generally functions to derive a representation of the surrounding environment being perceived by vehicle 600, (ii) a prediction subsystem 502b that generally functions to predict the future state of each object detected in the vehicle's surrounding environment, (iii) a planning subsystem 502c that generally functions to derive a behavior plan for vehicle 600, (iv) a control subsystem 502d that generally functions to transform the behavior plan for vehicle 600 into control signals for causing vehicle 600 to execute the behavior plan, and (v) a vehicle-interface subsystem 502e that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502a, which may be configured to fuse together various different types of "raw" data that relate to the vehicle's perception of its surrounding environment and thereby derive a representation of the surrounding environment being perceived by vehicle 600. In this respect, the "raw" data that is used by perception subsystem 502a to derive the representation of the vehicle's surrounding environment may take any of various forms.

For instance, at a minimum, the "raw" data that is used by perception subsystem 502a may include multiple different types of sensor data captured by sensor system 501, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 600 that indicates the past and current position, orientation, velocity, and acceleration of vehicle 600. Additionally, the "raw" data that is used by perception subsystem 502a may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502a may include navigation data for vehicle 600 that indicates a specified origin and/or specified destination for vehicle 600, which may be obtained from a remote computing system (e.g., a transportation-matching system) and/or input by a human riding in vehicle 600 via a user-interface component that is communicatively coupled to on-board computing system 502. Additionally still, the "raw" data that is used by perception subsystem 502*a* may include other types of data that may provide context for the vehicle's perception of its surrounding environment, such as weather data and/or traffic data, which may be obtained from a remote computing system. The "raw" data that is used by perception subsystem 502*a* may include other types of data as well.

Advantageously, by fusing together multiple different types of raw data (e.g., both 2D sensor data and 3D sensor data), perception subsystem 502*a* is able to leverage the relative strengths of these different types of raw data in a way that may produce a more accurate and precise representation of the surrounding environment being perceived by vehicle 600.

Further, the function of deriving the representation of the surrounding environment perceived by vehicle 600 using the raw data may include various aspects. For instance, one aspect of deriving the representation of the surrounding environment perceived by vehicle 600 using the raw data may involve determining a current state of vehicle 600 itself, such as a current position, a current orientation, a current velocity, and/or a current acceleration, among other possibilities. In this respect, perception subsystem 502*a* may employ a localization technique such as SLAM to assist in the determination of the vehicle's current position and/or orientation in relation to the surrounding map data. By localizing the vehicle 600 in relation to the surrounding map data in this way, the perception subsystem 502*a* may access encoded knowledge about the surrounding environment that is contained within the map data, but which otherwise might not be detectable by the sensor system 501 (e.g., prior agent trajectories).

Alternatively, it is possible that on-board computing system 502 may run a separate localization service that determines, based on the captured sensor data, position and/or orientation values for vehicle 600 in relation to the associated map data, in which case these position and/or orientation values may serve as another input to perception subsystem 502*a*.

Another aspect of deriving the representation of the surrounding environment perceived by vehicle 600 using the raw data may involve detecting objects within the vehicle's surrounding environment, which may result in the determination of class labels, bounding boxes, or the like for each detected object. In this respect, the particular classes of objects that are detected by perception subsystem 502*a* (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502*a* may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 600 using the raw data may involve determining a current state of each object detected in the vehicle's surrounding environment, such as a current position (which could be reflected in terms of coordinates and/or in terms of a distance and direction from vehicle 600), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 600, among other possibilities.

The function of deriving the representation of the surrounding environment perceived by vehicle 600 using the raw data may include other aspects as well.

Further yet, the derived representation of the surrounding environment perceived by vehicle 600 may incorporate various different information about the surrounding environment perceived by vehicle 600, examples of which may include (i) a respective set of information for each object detected in the vehicle's surrounding, such as a class label, a bounding box, and/or state information for each detected object, (ii) a set of information for vehicle 600 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 600 may incorporate other types of information about the surrounding environment perceived by vehicle 600 as well.

Still further, the derived representation of the surrounding environment perceived by vehicle 600 may be embodied in various forms. For instance, as one possibility, the derived representation of the surrounding environment perceived by vehicle 600 may be embodied in the form of a data structure that represents the surrounding environment perceived by vehicle 600, which may comprise respective data arrays (e.g., vectors) that contain information about the objects detected in the surrounding environment perceived by vehicle 600, a data array that contains information about vehicle 600, and/or one or more data arrays that contain other semantic information about the surrounding environment. Such a data structure may be referred to as a "parameter-based encoding."

As another possibility, the derived representation of the surrounding environment perceived by vehicle 600 may be embodied in the form of a rasterized image that represents the surrounding environment perceived by vehicle 600 in the form of colored pixels. In this respect, the rasterized image may represent the surrounding environment perceived by vehicle 600 from various different visual perspectives, examples of which may include a "top down" view and a "bird's eye" view of the surrounding environment, among other possibilities. Further, in the rasterized image, the objects detected in the surrounding environment of vehicle 600 (and perhaps vehicle 600 itself) could be shown as color-coded bitmasks and/or bounding boxes, among other possibilities.

The derived representation of the surrounding environment perceived by vehicle 600 may be embodied in other forms as well.

As shown, perception subsystem 502*a* may pass its derived representation of the vehicle's surrounding environment to prediction subsystem 502*b*. In turn, prediction subsystem 502*b* may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 600 to anticipate how the real-world objects in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object). Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 600.

After predicting the future state of each object detected in the surrounding environment perceived by vehicle 600 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 600, which defines the desired driving behavior of vehicle 600 for some future period of time (e.g., the next 5 seconds).

The behavior plan that is derived for vehicle 600 may take various forms. For instance, as one possibility, the derived behavior plan for vehicle 600 may comprise a planned trajectory for vehicle 600 that specifies a planned state of vehicle 600 at each of one or more future times (e.g., each second over the next 5 seconds), where the planned state for each future time may include a planned position of vehicle 600 at the future time, a planned orientation of vehicle 600 at the future time, a planned velocity of vehicle 600 at the future time, and/or a planned acceleration of vehicle 600 (whether positive or negative) at the future time, among other possible types of state information. As another possibility, the derived behavior plan for vehicle 600 may comprise one or more planned actions that are to be performed by vehicle 600 during the future window of time, where each planned action is defined in terms of the type of action to be performed by vehicle 600 and a time and/or location at which vehicle 600 is to perform the action, among other possibilities. The derived behavior plan for vehicle 600 may define other planned aspects of the vehicle's behavior as well.

Further, in practice, planning subsystem 502c may derive the behavior plan for vehicle 600 in various manners. For instance, as one possibility, planning subsystem 502c may be configured to derive the behavior plan for vehicle 600 by (i) deriving a plurality of different "candidate" behavior plans for vehicle 600 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 600. Planning subsystem 502c may derive the behavior plan for vehicle 600 in various other manners as well.

After deriving the behavior plan for vehicle 600, planning subsystem 502c may pass data indicating the derived behavior plan to control subsystem 502d. In turn, control subsystem 502d may be configured to transform the behavior plan for vehicle 600 into one or more control signals (e.g., a set of one or more command messages) for causing vehicle 600 to execute the behavior plan. For instance, based on the behavior plan for vehicle 600, control subsystem 502d may be configured to generate control signals for causing vehicle 600 to adjust its steering in a specified manner, accelerate in a specified manner, and/or brake in a specified manner, among other possibilities.

As shown, control subsystem 502d may then pass the one or more control signals for causing vehicle 600 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 600 to continually update both its understanding of the surrounding environment and its planned behavior within that surrounding environment.

Although not specifically shown, it should be understood that vehicle 600 includes various other systems and components as well, including but not limited to a propulsion system that is responsible for creating the force that leads to the physical movement of vehicle 600.

Figure 6:
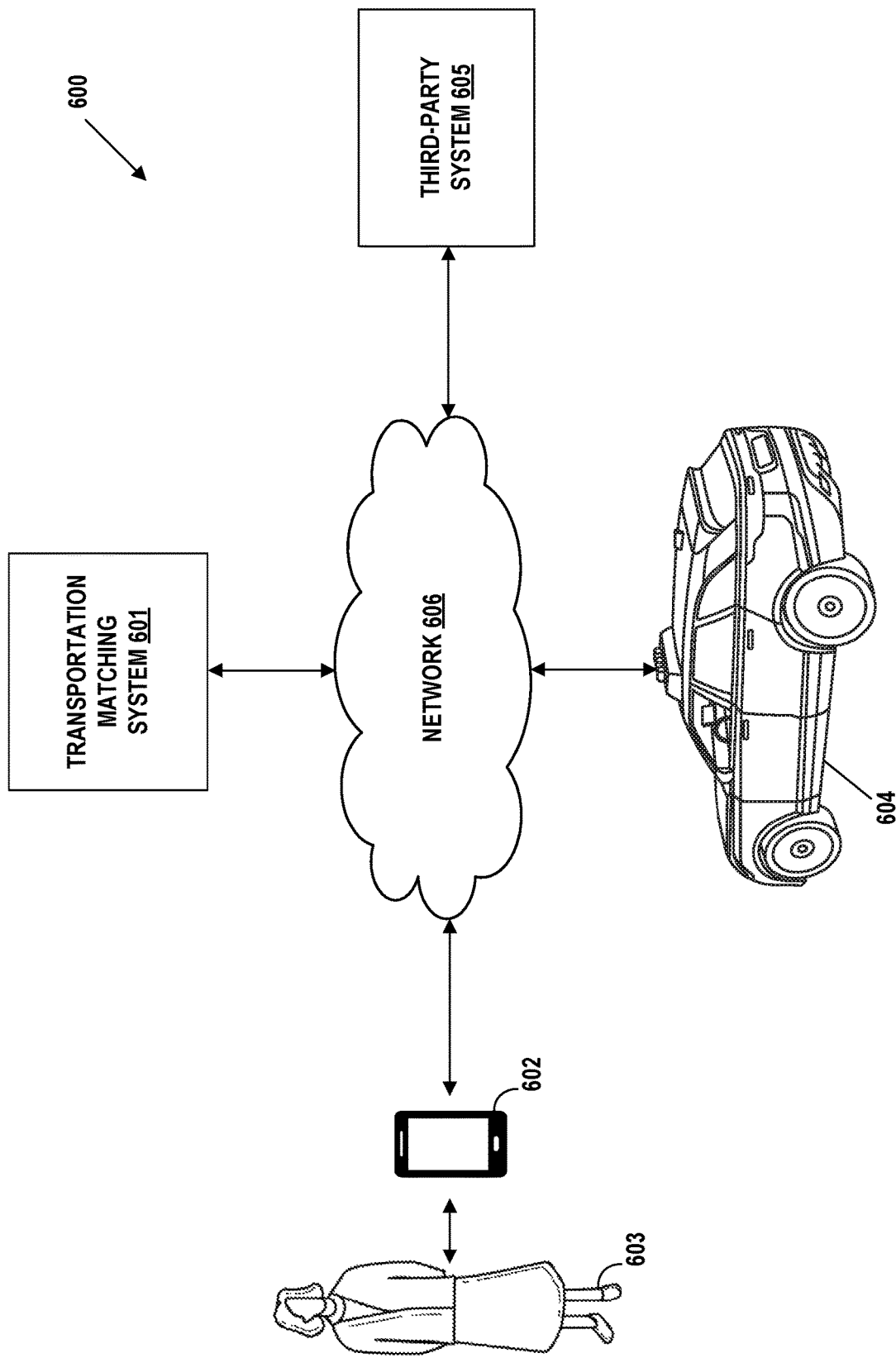
FIG. 6 is a simplified block diagram that illustrates one example of a transportation-matching platform.

Turning now to FIG. 6, a simplified block diagram is provided to illustrate one example of a transportation-matching platform 600 that functions to match individuals interested in obtaining transportation from one location to another with vehicles that can provide such transportation.

As shown, transportation-matching platform 600 may include at its core a transportation-matching system 601, which may be communicatively coupled via a communication network 606 to (i) a plurality of client stations of transportation requestors, of which client station 602 of transportation requestor 603 is shown as one representative example, (ii) a plurality of vehicles that are capable of providing the requested transportation, of which vehicle 604 is shown as one representative example, and (iii) a plurality of third-party systems that are capable of providing respective subservices that facilitate the platform's transportation matching, of which third-party system 605 is shown as one representative example.

Broadly speaking, transportation-matching system 601 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 601 may comprise computing infrastructure of a public, private, and/or hybrid cloud (e.g., computing and/or storage clusters). In this respect, the entity that owns and operates transportation-matching system 601 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 601 may comprise one or more dedicated servers. Other implementations of transportation-matching system 601 are possible as well.

As noted, transportation-matching system 601 may be configured to perform functions related to managing and facilitating transportation matching, which may take various forms. For instance, as one possibility, transportation-matching system 601 may be configured to receive transportation requests from client stations of transportation requestors (e.g., client station 602 of transportation requestor 603) and then fulfill such transportation requests by dispatching suitable vehicles, which may include vehicle 604. In this respect, a transportation request from client station 602 of transportation requestor 603 may include various types of information.

For example, a transportation request from client station 602 of transportation requestor 603 may include specified pick-up and drop-off locations for the transportation. As another example, a transportation request from client station 602 of transportation requestor 603 may include an identifier that identifies transportation requestor 603 in transportation-matching system 601, which may be used by transportation-matching system 601 to access information about transportation requestor 603 (e.g., profile information) that is stored in one or more data stores of transportation-matching system 601 (e.g., a relational database system), in accordance with the transportation requestor's privacy settings. This transportation requestor information may take various forms, examples of which include profile information about transportation requestor 603. As yet another example, a transportation request from client station 602 of transportation requestor 603 may include preferences information for transportation requestor 603, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 601 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 601 receives a request for transportation from San Francisco International Airport (SFO) to Palo Alto, California, system 601 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 601. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 601.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 601 could be configured to predict and provide ride suggestions in response to a transportation request. For instance, transportation-matching system 601 may be configured to apply one or more machine-learning techniques to such historical data in order to "train" a machine-learning model to predict ride suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 601 may only be capable of storing and later accessing historical data for a given transportation requestor if the given transportation requestor previously decided to "opt-in" to having such information stored. In this respect, transportation-matching system 601 may maintain respective privacy settings for each transportation requestor that uses transportation-matching platform 600 and operate in accordance with these settings. For instance, if a given transportation requestor did not opt-in to having his or her information stored, then transportation-matching system 601 may forgo performing any of the above-mentioned functions based on historical data. Other possibilities also exist.

Transportation-matching system 601 may be configured to perform various other functions related to managing and facilitating transportation matching as well.

Referring again to FIG. 6, client station 602 of transportation requestor 603 may generally comprise any computing device that is configured to facilitate interaction between transportation requestor 603 and transportation-matching system 601. For instance, client station 602 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 603 and transportation-matching system 601 (which may be embodied in the form of a software application, such as a mobile application, web application, or the like). In this respect, the interaction that may take place between transportation requestor 603 and transportation-matching system 601 may take various forms, representative examples of which may include requests by transportation requestor 603 for new transportation events, confirmations by transportation-matching system 601 that transportation requestor 603 has been matched with a vehicle (e.g., vehicle 604), and updates by transportation-matching system 601 regarding the progress of the transportation event, among other possibilities.

In turn, vehicle 604 may generally comprise any kind of vehicle that can provide transportation, and in one example, may take the form of vehicle 600 described above. Further, the functionality carried out by vehicle 604 as part of transportation-matching platform 600 may take various forms, representative examples of which may include receiving a request from transportation-matching system 601 to handle a new transportation event, driving to a specified pickup location for a transportation event, driving from a specified pickup location to a specified drop-off location for a transportation event, and providing updates regarding the progress of a transportation event to transportation-matching system 601, among other possibilities.

Generally speaking, third-party system 605 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 601.

Moreover, third-party system 605 may be configured to perform functions related to various subservices. For instance, as one possibility, third-party system 605 may be configured to monitor traffic conditions and provide traffic data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the vehicle's behavior plan, among other possibilities.

As another possibility, third-party system 605 may be configured to monitor weather conditions and provide weather data to transportation-matching system 601 and/or vehicle 604, which may be used for a variety of purposes. For example, transportation-matching system 601 may use such data to facilitate fulfilling transportation requests in the first instance and/or updating the progress of initiated transportation events, and vehicle 604 may use such data to facilitate updating certain predictions regarding perceived agents and/or the collection vehicle's behavior plan, among other possibilities.

As yet another possibility, third-party system 605 may be configured to authorize and process electronic payments for transportation requests. For example, after transportation requestor 603 submits a request for a new transportation event via client station 602, third-party system 605 may be configured to confirm that an electronic payment method for transportation requestor 603 is valid and authorized and then inform transportation-matching system 601 of this confirmation, which may cause transportation-matching system 601 to dispatch vehicle 604 to pick up transportation requestor 603. After receiving a notification that the transportation event is complete, third-party system 605 may then charge the authorized electronic payment method for transportation requestor 603 according to the fare for the transportation event. Other possibilities also exist.

Third-party system 605 may be configured to perform various other functions related to sub services that facilitate the platform's transportation matching as well. It should be understood that, although certain functions were discussed as being performed by third-party system 605, some or all of these functions may instead be performed by transportation-matching system 601.

As discussed above, transportation-matching system 601 may be communicatively coupled to client station 602, vehicle 604, and third-party system 605 via communication network 606, which may take various forms. For instance, at a high level, communication network 606 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 6 may take other forms as well, including the possibility that such communication paths include communication links and/or intermediate devices that are not shown.

In the foregoing arrangement, client station 602, vehicle 604, and/or third-party system 605 may also be capable of indirectly communicating with one another via transportation-matching system 601. Additionally, although not shown, it is possible that client station 602, vehicle 604, and/or third-party system 605 may be configured to communicate directly with one another as well (e.g., via a short-range wireless communication path or the like). Further, vehicle 604 may also include a user-interface system that may facilitate direct interaction between transportation requestor 603 and vehicle 604 once transportation requestor 603 enters vehicle 604 and the transportation event begins.

It should be understood that transportation-matching platform 600 may include various other entities and take various other forms as well.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
   after one or more sensor-equipped vehicles have traversed a real-world environment and captured sensor data that is representative of the real-world environment, performing an analysis of the sensor data;
   based on the analysis of the sensor data, detecting a stationary element in the real-world environment;
   accessing map data for the real-world environment;
   evaluating whether the detected stationary element is encoded within the accessed map data for the real-world environment and thereby determining that the detected stationary element is not encoded within the accessed map data for the real-world environment; and
   in response to determining that the detected stationary element is not encoded within the accessed map data for the real-world environment:
      deriving a first set of information about the detected stationary element based on an analysis of sensor data that is representative of the detected stationary element;
      detecting a semantic relationship between the detected stationary element and one or more other stationary elements in the real-world environment based on an analysis of one or both of (i) the sensor data captured by one or more sensor-equipped vehicles while operating in the real-world environment or (ii) the accessed map data for the real-world environment;
      based on the detected semantic relationship, inferring a second set of information about the detected stationary element; and
      combining the first and second sets of information about the detected stationary element into a combined set of information that describes the detected stationary element.

2. The computer-implemented method of claim 1, wherein the detected stationary element comprises a traffic light and the one or more other stationary elements comprise one or both of (i) a traffic sign or (ii) a traffic lane.

3. The computer-implemented method of claim 2, wherein the inferred second set of information comprises one or more of (i) signal-face information for the traffic light, (ii) lane-control information for the traffic light, or (iii) traffic-rule information for the traffic light.

4. The computer-implemented method of claim 1, wherein the detected stationary element comprises a traffic light, and wherein detecting the semantic relationship between the traffic light and the one or more other stationary elements comprises:
   detecting a traffic sign of a given type that is located in a given direction relative to the traffic light and within a threshold distance from the traffic light.

5. The computer-implemented method of claim 1, wherein the detected stationary element comprises a traffic lane, and wherein detecting the semantic relationship between the traffic lane and the one or more other stationary elements comprises:
   detecting a traffic sign of a given type that is located adjacent to the traffic lane.

6. The computer-implemented method of claim 1, wherein inferring the second set of information about the detected stationary element comprises:
   deriving information about the one or more other stationary elements in the real-world environment; and
   using the derived information about the one or more other stationary elements as a basis for inferring the information about the detected stationary element.

7. The computer-implemented method of claim 6, wherein the one or more other stationary elements in the real-world environment comprise a traffic sign, and wherein the derived information about the traffic sign comprises one or more of (i) a classification of the traffic sign or (ii) an indication of text that is displayed on the traffic sign.

8. The computer-implemented method of claim 1, further comprising:
   encoding the combined set of information that describes the detected stationary element into a map for the real-world environment.

9. The computer-implemented method of claim 1, further comprising:
   using the combined set of information that describes the detected stationary element as training data for a machine-learning model that is configured to predict information about corresponding stationary elements of a same type as the detected stationary element.

10. The computer-implemented method of claim 9, wherein the information about the corresponding stationary elements comprises information indicating that a semantic relationship exists between the corresponding stationary elements and one or more other stationary elements.

11. The computer-implemented method of claim 1, further comprising:
   updating a map for the real-world environment to include the combined set of information that describes the detected stationary element; and
   based on the combined set of information that describes the detected stationary element in the updated map, generating a route for a vehicle to follow in the real-world environment.

12. A non-transitory computer-readable medium comprising program instructions stored thereon that are executable to cause a computing system to:
   after one or more sensor-equipped vehicles have traversed a real-world environment and captured sensor data that is representative of the real-world environment, perform an analysis of the sensor data;
   based on the analysis of the sensor data, detect a stationary element in the real-world environment;
   access map data for the real-world environment;
   evaluate whether the detected stationary element is encoded within the accessed map data for the real-world environment and thereby determine that the detected stationary element is not encoded within the accessed map data for the real-world environment; and
   in response to determining that the detected stationary element is not encoded within the accessed map data for the real-world environment:
      derive a first set of information about the detected stationary element based on an analysis of sensor data that is representative of the detected stationary element;
      detect a semantic relationship between the detected stationary element and one or more other stationary elements in the real-world environment based on an analysis of one or both of (i) the sensor data captured by one or more sensor-equipped vehicles while operating in the real-world environment or (ii) the accessed map data for the real-world environment;
      based on the detected semantic relationship, infer a second set of information about the detected stationary element; and
      combine the first and second sets of information about the detected stationary element into a combined set of information that describes the detected stationary element.

13. The computer-readable medium of claim 12, wherein the detected stationary element comprises a traffic light and the one or more other stationary elements comprise one or both of (i) a traffic sign or (ii) a traffic lane.

14. The computer-readable medium of claim 13, wherein the inferred second set of information comprises one or more of (i) signal-face information for the traffic light, (ii) lane-control information for the traffic light, or (iii) traffic-rule information for the traffic light.

15. The computer-readable medium of claim 12, wherein the detected stationary element comprises a traffic light, and wherein detecting the semantic relationship between the traffic light and the one or more other stationary elements comprises:
   detecting a traffic sign of a given type that is located in a given direction relative to the traffic light and within a threshold distance from the traffic light.

16. The computer-readable medium of claim 12, wherein the detected stationary element comprises a traffic lane, and wherein detecting the semantic relationship between the traffic lane and the one or more other stationary elements comprises:
   detecting a traffic sign of a given type that is located adjacent to the traffic lane.

17. The computer-readable medium of claim 12, wherein the computer-readable medium further comprises program instructions stored thereon that are executable to cause the computing system to:
   encode the combined set of information that describes the detected stationary element into a map for the real-world environment.

18. The computer-readable medium of claim 12, wherein the computer-readable medium further comprises program instructions stored thereon that are executable to cause the computing system to:

update a map for the real-world environment to include the combined set of information that describes the detected stationary element; and based on the combined set of information that describes the detected stationary element in the updated map, generate a route for a vehicle to follow in the real-world environment.

19. A computing system comprising:

at least one processor;

a non-transitory computer-readable medium; and program instructions stored on the non-transitory computer-readable medium that are executable by the at least one processor such that the computing system is capable of:

after one or more sensor-equipped vehicles have traversed a real-world environment and captured sensor data that is representative of the real-world environment, performing an analysis of the sensor data;

based on the analysis of the sensor data, detecting a stationary element in the real-world environment;

accessing map data for the real-world environment;

evaluating whether the detected stationary element is encoded within the accessed map data for the real-world environment and thereby determining that the detected stationary element is not encoded within the accessed map data for the real-world environment; and in response to determining that the detected stationary element is not encoded within the accessed map data for the real-world environment:

deriving a first set of information about the detected stationary element based on an analysis of sensor data that is representative of the detected stationary element;

detecting a semantic relationship between the detected stationary element and one or more other stationary elements in the real-world environment based on an analysis of one or both of (i) the sensor data captured by one or more sensor-equipped vehicles while operating in the real-world environment or (ii) the accessed map data for the real-world environment;

based on the detected semantic relationship, inferring a second set of information about the detected stationary element; and combining the first and second sets of information about the detected stationary element into a combined set of information that describes the detected stationary element.

* * * * *